US008626757B1

(12) United States Patent
Ball et al.

(10) Patent No.: US 8,626,757 B1
(45) Date of Patent: Jan. 7, 2014

(54) SYSTEMS AND METHODS FOR DETECTING NETWORK RESOURCE INTERACTION AND IMPROVED SEARCH RESULT REPORTING

(75) Inventors: Derek Ball, Calgary (CA); Dayton Foster, Calgary (CA); Allan MacKenzie, Calgary (CA)

(73) Assignee: Tynt Multimedia, Inc., New York, NY (US)

( * ) Notice: Subject to any disclaimer, the term of this patent is extended or adjusted under 35 U.S.C. 154(b) by 0 days.

(21) Appl. No.: 13/593,396

(22) Filed: Aug. 23, 2012

Related U.S. Application Data

(63) Continuation of application No. 12/683,375, filed on Jan. 6, 2010, now Pat. No. 8,275,766.

(60) Provisional application No. 61/193,897, filed on Jan. 6, 2009, provisional application No. 61/272,186, filed on Aug. 28, 2009, provisional application No. 61/272,330, filed on Sep. 14, 2009.

(51) Int. Cl.
*G06F 17/30* (2006.01)
(52) U.S. Cl.
USPC ........................................................ 707/727
(58) Field of Classification Search
USPC ........................................................ 707/727
See application file for complete search history.

(56) References Cited

U.S. PATENT DOCUMENTS

| 6,341,306 | B1 | 1/2002 | Rosenschein et al. |
| 6,567,801 | B1 | 5/2003 | Chiang et al. |
| 6,785,670 | B1 | 8/2004 | Chiang et al. |
| 7,308,439 | B2 | 12/2007 | Baird et al. |
| 7,590,949 | B2 | 9/2009 | Yuzawa et al. |
| 7,797,301 | B1 | 9/2010 | Baird et al. |
| 2005/0086219 | A1 | 4/2005 | Martin |
| 2006/0230058 | A1 | 10/2006 | Morris |
| 2007/0112761 | A1* | 5/2007 | Xu et al. ........................... 707/5 |
| 2007/0233692 | A1 | 10/2007 | Lisa et al. |
| 2007/0271255 | A1 | 11/2007 | Pappo |
| 2008/0027707 | A1 | 1/2008 | Stefik et al. |
| 2009/0171907 | A1 | 7/2009 | Radovanovic |
| 2009/0172514 | A1 | 7/2009 | Radovanovic |
| 2009/0271388 | A1 | 10/2009 | Murdock et al. |
| 2009/0276408 | A1 | 11/2009 | Auerbach et al. |
| 2010/0174703 | A1 | 7/2010 | Dandekar et al. |
| 2010/0287170 | A1 | 11/2010 | Liu et al. |

OTHER PUBLICATIONS

Shen, Xuehua et al., Implicit User Modeling for Personalized Search, CIKM '05, Oct. 31-Nov. 5, 2005, pp. 824-831, Bremen, Germany.

* cited by examiner

*Primary Examiner* — Hosain Alam
*Assistant Examiner* — Johnese Johnson
(74) *Attorney, Agent, or Firm* — Patent Law Works LLP

(57) ABSTRACT

Systems and methods are described for intercepting user interactions without network provided content. The intercepted information can be used for prioritizing search results by statistical and other analysis of user interactions with a network resource and/or network content. A server connected to a network can receive captured information from an agent that is installed in a device connected to the network. The captured information can be related to an interaction of a user with a network resource. An aggregator may be provided to aggregate the captured information with other captured information related to a plurality of network resources and maintains a repository of aggregated captured information. A prioritizer can determine the relevance of network content based on characteristics of the aggregated captured information. The prioritizer determines relevance for a plurality of search results based on frequency of prior user interactions with the content of the search results.

18 Claims, 16 Drawing Sheets

SYSTEMS AND METHODS FOR DETECTING NETWORK RESOURCE INTERACTION AND IMPROVED SEARCH RESULT REPORTING

CROSS-REFERENCE TO RELATED APPLICATIONS

The present application is a continuation of U.S. Non-Provisional patent application Ser. No. 12/683,375 filed Jan. 6, 2010, which claims priority from U.S. Provisional Patent Application No. 61/193,897 filed Jan. 6, 2009, U.S. Provisional Patent Application No. 61/272,186 filed Aug. 28, 2009, and from U.S. Provisional Patent Application No. 61/272,330 filed Sep. 14, 2009, which applications are expressly incorporated by reference herein for all purposes.

BACKGROUND OF THE INVENTION

1. Field of the Invention

The present invention relates generally to data transfer between computer resources and more particularly to data transfer between computer systems that communicate by means of a network.

2. Description of Related Art

All publications, patents and patent applications cited within this application are herein incorporated by reference in their entirety to the same extent as if the disclosure of each individual publication, patent application or patent was specifically and individually indicated to be incorporated by reference in its entirety.

In recent years the popularity of computers, and the communication networks established between these computers, have increased dramatically. Such networks allow computer users, either in a business, government or personal setting, to communicate with each other, either through a centralized communication point, through a plurality of distributed and redundant communication points, or directly. This allows exchange of information between the computers on the communication network, using a common communication protocol between them. It is common for corporations or business to establish a common communications network between their computers, otherwise referred to as "intranets", in which the communication network has limited or no access to unauthorized persons and/or computers. It is common for intranets to be protected by security systems, such as firewalls, which prevent access by unauthorized users of the communications network, the computers communicating through it, and the information contained within these computers.

The term "Internet" has been adopted to describe the publicly available network which has nearly worldwide coverage, and to which most personal computers have access. The pervasive nature of the Internet, combined with the lower cost and increased performance of personal computers, has led to it being a popular source of information. Systems are available which provide an individual with the ability to search for information or resources within the Internet. For example, systems exist which allow a user to search for information stored on other Internet computers (i.e., servers), thus providing generalized access to these resources. Unfortunately, when an individual is searching for specific information, the resource on the Internet may not provide the specific information desired by the individual, or else it may provide certain information in an undesired context. The individual may then continue searching, or else use an alternate system to perform the required searching activities. In general, these searching systems provide minimal ability for a user to provide feedback as to the success of the search, or ways for the user to refine future searches. Generally, the user establishes a series of search terms to initiate a search, and upon failure of the search results to provide the user with what he is looking for, the user modifies or adds further search terms in an effort to increase the chance of success on the next search. Alternatively, the user may switch to an alternate search system and attempt to obtain a successful search result using that second system.

Computers communicate within a network using a common set of standards for exchanging data. One common example is the Transmission Control Protocol/Internet Protocol (TCP/IP) suite. To initiate communications within the communication network, a user (client) may contact another computer on the network (server) and request information or a resource. This is facilitated by various software and hardware systems generally available. A user can access resources within the Internet by being directed through software (e.g., by clicking a hyperlink), by entering a Universal Resource Locator (URL), etc.

A popular protocol for organizing and sharing information on the Internet via the client/server model is known as the HyperText Transfer Protocol (HTTP), and is more commonly referred to in a general sense as the World Wide Web (the web). Generally, the web links information by associating items of interest through the use of HyperText Markup Language (HTML) files, which reside on servers and usually are transferred to clients via HTTP. A user of the web may traverse it by receiving and viewing an HTML file (or just an image, video, etc.), which may contain within it information or embedded images, but which also may contain information on how to acquire further resources from the web, by, for example, incorporating URLs within the file. This information may be displayed to a user as a combination of text and media (for example images, sound, video) and generally is referred to as a "page" or "web page." Generally, the user uses a client, called a web browser, to interact with the web and the various files found on it (e.g., HTML, audio and video files, etc.).

No central authority exists for cataloguing the hundreds of millions of network resources, such as HTML pages, files or media available within an intranet or the Internet. In general though, there are two approaches taken for finding information or resources of interest within a network: 1) a directory hierarchy and 2) a search engine.

Within a directory hierarchy a web page may be analyzed and categorized, allowing users to scan through various categories, and associated subcategories, to identify resources of interest. Alternatively, a search engine may provide a dataset of terms and phrases (keywords) upon which a user may query, and may return a listing of web resources associated with the keywords. Many such search engines are known in the art, with examples including, but not limited to, Google®, Yahoo® and Alta Vista®

A search engine generally includes two main parts: an index searcher and an index generator. An index searcher may include a database of indexing keywords of web pages and logic for searching the database. An index generator may include a "spider" for gathering web pages and an "indexer" for generating an index into those pages. Typically, a search engine works by sending out the spider to fetch web pages (by, for example, following the various links that exist on an initial set of web pages). The indexer may then read these pages and create an index based on the words contained in each page. Search engines typically use a proprietary algorithm to create their indices such that, ideally, only meaningful results are returned for each query. Provided with a page by a spider, an indexer may parse the document and insert selected keywords into the database with references back to the original location of the source page. How this is accomplished depends on the indexer. Some indexers index the titles of the web pages or just the first few paragraphs. Some parse the entire contents and index all words. Some parse available meta-tags or other special hidden tags. Meta-tags are special HTML tags that are meant to provide information about a web page. Unlike normal HTML tags, meta-tags do not affect how the page is displayed. Instead, they provide information such as who created the page, how often it is updated, what the page is about, and which keywords represent the page's content. Many search engines use this information when building their indices.

A common problem for these search engines is that they are, by necessity, automated. As such, the vagaries of human language may result in search results that are not always relevant to the query. For example, searching upon the keywords of "Miami" and "dolphins" may return web resources relevant to both a professional football team based in Florida, as well as aquatic mammals on display within the Miami locale. Further, automated search engines generally are poorly constructed to translate the context of web resources into a form searchable by keywords. For example, if searching for information regarding a consumer product, you are likely to receive web resources related to an individual consumer's experience with the product in addition to web resources which enable one to purchase the product. Finally, the relevance of any given web resource returned in response to a search engine query may be based upon a multitude of different factors, such as the number of web pages which refer to a given web resource, the number of times a given keyword appears within the text of a web resource, whether a person or corporation has paid the provider of the search engine to receive more favorable treatment, etc. Therefore significant effort may be required of the user in order to obtain relevant and preferred information via a search engine.

Furthermore, the Internet has voluminous resources and information sources available to it, yet the ability for an individual user to communicate or interact with a web resource generally is limited to that which the creator of the web resource allows. A user is limited in his ability to share or direct persons with whom he knows or shares a common interest; generally, he may either post a reference to the web resource on another web resource accessed by the persons he knows or accessed by those with whom he shares a common interest, or pass the URL to specific users or computers by direct communication, such as by electronic mail.

Many of the computers used today are capable of multi-tasking, and further provide a variety of user interfaces for controlling various and multiple application programs or system functions simultaneously operating in the computer environment. Personal Computers ("PC") are particularly commonplace, operating with an operating system ("OS") capable of multi-tasking such as Microsoft Windows™ or Apple Computer's MacOS™, or LINUX™. Smaller computing platforms such as held-held computers, personal digital assistants ("PDA"), and advanced wireless telephones may run operating systems capable of multitasking as well.

Users often wish to copy or transfer information or "content" from one program or system function within an OS environment, to another. Using "copy and paste" functions of the application programs and the operating system, the user may select information from a source program (e.g. a Web Browser receiving and displaying information received over an Internet), and "paste" it into the destination program (e.g. a text editing program or document creation program). The copy and paste process is described more fully in U.S. patent application Ser. No. 12/192,391, hereby incorporated herein by reference, in its entirety, including figures, to the present patent application.

With respect to the accessing of information through a network, for example an Internet, it is a problem in the present state of the art that people who publish content (text, images, audio, etc.) accessible within a network can easily have their content copied without their knowledge or authorization. The very functionality of the copy and paste within an OS make this easy in the digital world. Industry observers sometimes refer to this as 'atomization' of content.

Tools exist to help content publishers find when their content has been copied and posted on other websites or blogs, however, no tools exist to help content owners learn who is using simple cut and paste functions to copy data from their website within their PC, into products such as e-mail, Microsoft Word™, PowerPoint™ or other programs or system functions. It is currently impossible for publishers to monitor this cutting and pasting process because they have no ability to include attribution with the copied content. With monitoring and tracking, it is possible that publishers of content may be better able to monetize the copying and usage of their published content.

BRIEF SUMMARY OF THE INVENTION

The prior art has suffered from an inability to properly monitor user interactions with network resources, and implement attribution of content copied from a digital network resource available within a computer network, such as an Internet.

Certain embodiments of the invention provide systems and methods for prioritizing search results. Prioritization may be performed using statistical and other analyses of interactions by one or more users with a network resource and/or network content. A server connected to a network can receive captured information from an agent that is installed in a device connected to the network. The captured information can be related to an interaction of a user with a network resource. An aggregator may be provided to aggregate the captured information with other captured information related to a plurality of network resources and maintains a repository of aggregated captured information. A prioritizer can determine the relevance of network content based on characteristics of the aggregated captured information.

The captured information and the other captured information may characterize the type of user interaction with a network resource. The interactions with the plurality of network resources can include at least one of a copy and a mouse-over event, a selection of a displayed link and/or copying of a portion of content provided by one of the network resources. The agent typically detects copy, mouse-over and link selection events by intercepting input provided by input devices controlled by the user. The aggregated captured information for each user interaction can identify a type of interaction and the network resource involved in the user interaction. The aggregated captured information for each user interaction typically identifies a portion of content displayed to the user by the network resource and subject of the user interaction. The type of interaction may include a selection of the identified portion of content. The aggregated captured information for each user interaction can include a copy of the identified portion of content which may optionally include a link to other content provided by one or more network resources. The type of interaction may include a copying of the identified portion of content and wherein the aggregated captured information for each user interaction includes the copied identified portion of content. The aggregated captured information for each user interaction can include a copyright notice, an author attribution, and internet address of the user and/or a time of the each user interaction.

In certain embodiments, the prioritizer determines relevance for a plurality of search results based on frequency of prior user interactions with the content of the search results. The type of prior user interactions with the content of the search results may be identified in the aggregated captured information. The relevance of a search result can be determined based on an frequency of occurrence of prior user interactions with links and copies of content that do not include links identified in the aggregated captured information.

Certain embodiments of the invention provide systems and methods of processing search results. The method may be implemented using a computer system comprising one or more processors configured to execute one or more computer program modules. The program modules may be encoded as data and instructions in a storage medium. Certain embodiments comprise executing, on the one or more processors of the computer system, instructions that cause the computer to maintain a history of events representative of interactions by a plurality of users with content provided by one or more network resources. Some of these embodiments comprise executing, on the one or more processors of the computer system, instructions that cause the computer to determine relevance of results of a search using the history of events. Relevance can be determined based on frequencies of interactions with individual results of the search. Some of these embodiments comprise executing, on the one or more processors of the computer system, instructions that cause the computer to reorder the search results based on relevance. The interactions represented in the history of events include interactions with portions of content that do not include links and interactions related to copying and selection of portions of content.

The events can be obtained from one or more computer program modules configured to intercept elements of the content selected by the users for copying. The events may be maintained with additional related information that identifies a user, the selected elements, the content and/or a device displaying the content to the at least one user. Reordering the search results based on relevance may include a step of executing, on the one or more processors of the computer system, instructions that cause the computer to perform a statistical analysis correlating relevance with frequency of access of network resources. The statistical analysis may include an analysis of the copying of portions of the content, identification of most frequently copied elements within a web page, geographic location of one or more user, a tag cloud identifying the most frequently copied elements within a predetermined time period and/or frequency of generation of links, wherein the links are generated by appending information to copied portions of the content.

DETAILED DESCRIPTION OF THE INVENTION

Figure 1:
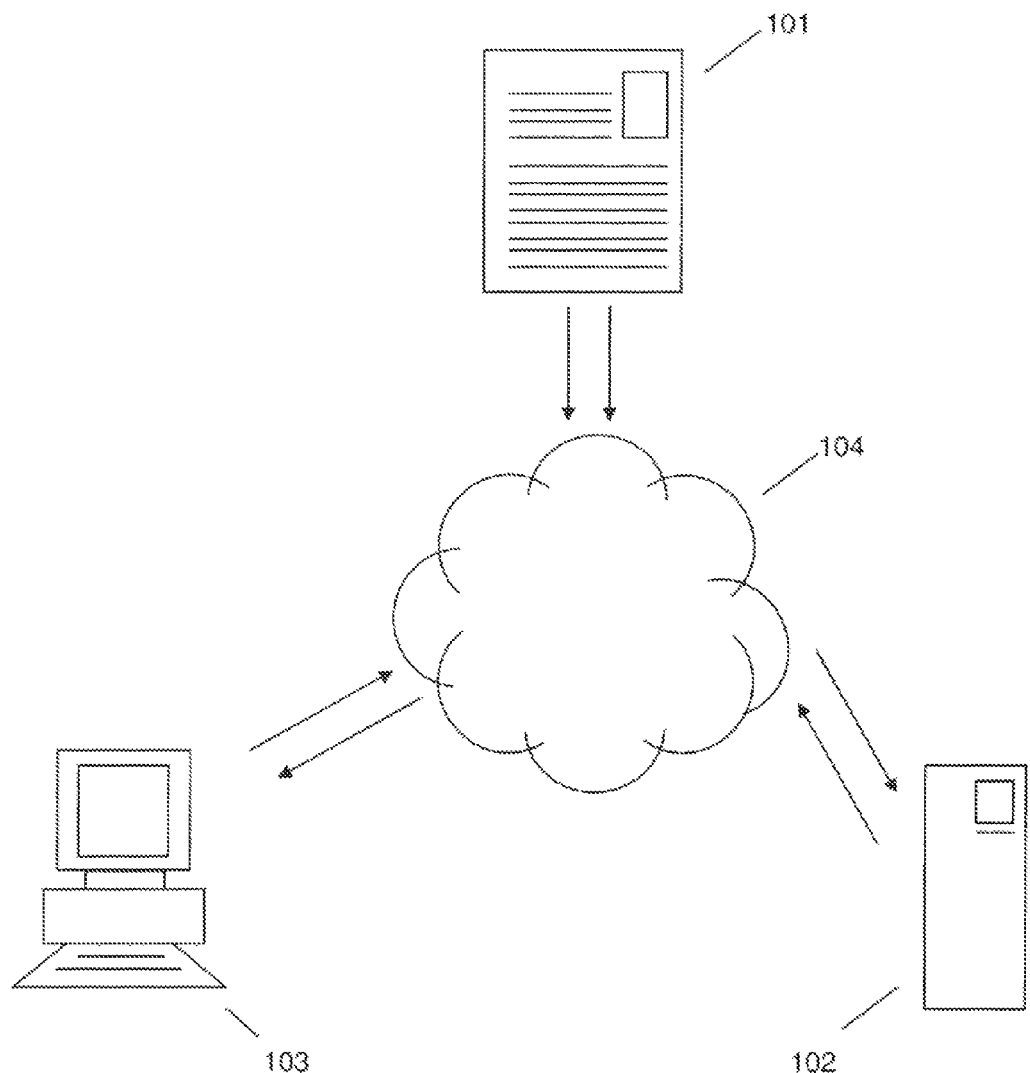
FIG. 1 shows a schematic of a communications flow for a user computer running user interaction detection client software, a RUII server and a network resource (for example, a web page) wherein the user computer is accessing a network resource via a network according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. For example, the descriptions below refer to a interactions between computers and it will be appreciated that the term computer can be taken to mean any suitable computing device such as servers, desktop computers, laptop computers, intelligent user devices such as cell-phones, PDAs, set-top boxes, game players and smart phones, etc. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the present invention provide methods and systems for detection of user interaction with network resources accessible within an electronic network. Furthermore, methods and systems are provided for increasing, or decreasing, the relevance of network resources comprising the results of a search through monitoring of user interactions with network resources.

Various search and retrieval techniques can be employed to make the search and retrieval process more deterministic or efficient. For example, in the field of web resource retrieval, a vocabulary for describing web resources, or documents, may be used, typically according to characteristics of the language itself. Such a system may operate much like an index of a book. For example, a description language may be derived based upon the frequency of occurrence of various words in the language and the juxtaposition statistics of these words (I.e., which words tend to appear together) within the web resource or document. This description language may then be used to group various documents and to later retrieve them.

One example of a search technique employs a keyword search that utilizes an index of keywords from an eligible listing. Another example comprises a network that maintains collections of documents and uses an arbitrary set of words to characterize each document in the collection. When a user subsequently requests the retrieval of particular documents, the user may guess at what terms were used in the classification process, or instead may be presented with a fixed list, such as a list of categories. For example, a user might request the system to locate all documents having to do with "balloons". The success of the search in this instance may be directly dependent on how many and which documents had been associated by the search system with the word "balloon". Since the choice of the words used by the system to characterize the documents may be, and likely is arbitrary, the user's rate of success at picking the same words to describe the same document may be somewhat random.

Generally, conventional keyword searches suffer from missing relevant documents or the retrieval of irrelevant documents, referred to as errors arising from "semantic mistyping." Since words can be used in variant senses, a document can satisfy a query perfectly well when using a keyword-matching method, but the words in the keyword listing (or even within the network resource itself) may be used in a different sense than those used in the search query from which the search results are generated. Thus, semantic mistyping may lead to a poor user experience by decreasing the availability of relevant documents. Further, since words in languages may have multiple meanings, the possibility of erroneous search results is not insignificant.

One method for mitigating errors attributable to semantic mistyping is to increase the relative ranking of network resources which are more "popular," with popularity determined through, for example, the frequency of a network resource being selected by a user in prior search results, the frequency of a network resource being selected by the search engine to be included in the search results, the number of references to the network resource present within a network (i.e. number of network resources linking to the particular network resource), etc. In the case where two network resources are otherwise equal with regard to their appropriateness as a search result, the one with the higher rank may appear before (or instead of, etc.) the one with the lower rank.

Increasing the rank of a network resource within a list of search results based upon the popularity of the network resource does not necessarily correlate with increasing the relevance of the network resource, and such behavior has aspects of a self-reinforcing system. For example, the presence of an irrelevant network resource within a list of search results may result in a user accessing the irrelevant network resource for a period of time sufficient for the user to realize that it is not relevant. The user may then select another network resource within the list of search results, and on this second attempt the network resource may be relevant. In such a situation, the search system has difficulty in identifying that the first network resource was not relevant, while identifying the second as relevant: i.e. both received a "click-through" and therefore may be considered equally relevant by the search engine. As such, many conventional search systems have difficulty identifying the relevance of network resources, this difficulty arising partially from the inherent vagaries of human language and the inherent weaknesses of search methodologies (such as keyword-based searches).

Certain embodiments of the present invention are broadly applicable to a variety of systems and are not limited to any particular programming language. For the purposes of this discussion only, descriptions will generally refer to embodiments of the invention using the JavaScript™ programming language, which is highly prevalent in many commercially available Internet browsers. In one embodiment, for example, a system comprises combinations of hardware and software. Software code is typically communicated proximate in time with, or concurrent with, the communication to a second computer of a network resource located on a first computer. For example, a web page may facilitate this communication whereby the code contains one or more functions according to certain aspects of the invention (described in more detail below); the network resource can comprise digital content of various types.

In certain embodiments, the code can be executed proximate in time to the provision of a display based, and/or including the network resource on the first computer. The display may be provided using a viewing program capable of viewing the network resource including, for example, a web browser. The execution of the code can provide a copy command intercept program operating on the first computer that is capable of interacting with the viewing program. The copy command intercept program is configured to alter the normal process of copy command application within at least the viewing program.

Upon selection of a copy command by the user (a "copy event") the copy command intercept program causes elements selected for copying to be transmitted into the user's copy/paste memory buffer of the second computer with additional content appended into the memory buffer such additional content being defined by a manager or administrator of the first computer. Optionally, the copy command intercept program reports copy events to at least one other computer in network communication with the second computer, the copy event information stored in a database for analysis. The copy event information typically comprises identification of the copied content (and/or the copied content itself), the URL of the original article, the IP address/geographic location of the browser performing the copying, and/or other information generally known in the art as useful for identifying relevance of information to a user. This information is then used to by the web page manager/administrator to better understand which network resources, or elements within a particular network resource are popular, frequently copied or of increased relevance to the user.

In certain embodiments, the additional content will be pasted as well when the user pastes the content subject to a copy event. Statistics can be generated for the web site manager/administrator for a variety of purposes, including:
   a. Help with attribution of content
   b. Better understand which elements of a network resource are interacted with by a user and how often
   c. Correlate user interactions with frequency of access of network resources.

In certain embodiments of the present invention, software code is communicated proximate in time, or concurrent with, the communication to a second computer of a network resource located on a first computer to a second computer. The network resource may include, for example, a web page and the code can include instructions that cause a computer to perform at least some of the functions provided according to certain aspects of the invention and described in more detail below. The network resource typically comprises digital content.

The code can be executed proximate in time to the network resource display on the first computer using a viewing program capable of viewing a network resource, such as a web browser. As a result, a detection computer program operating on the first computer is capable of interacting with the viewing program, whereby the detection program can identify user interactions with a network resource by means of a user interaction detection program.

When the user interacts with the network resource, the user interaction identification program typically causes the communication—from the second computer to the first computer, and/or to a third computer—of the occurrence of a user interaction with the network resource. Additional information may be communicated including information identifying the URL of the network resource, the internet address of the second computer, the time of user interaction with the network resource or elements within the network resource that are subject of the interaction. A user interaction with the network resource can include the copying of, the selection of and/or the printing of certain elements forming part of the network resource and/or can include the copying of the URL of the network resource.

The user interaction communicated to the first computer or third computer may be stored in a database for analysis. This information can then be used by the web page manager/administrator to better understand which content is popular, which is frequently copied and/or which content is of increased relevance to the user. In some embodiments, statistics are generated for the web site manager/administrator to:
  a. help with attribution of content,
  b. better understand which elements of a network resource are interacted with by a user and how often, and
  c. correlate user interactions with frequency or access of network resources.

According to certain aspects of the invention, the interaction of a user with a web page can include the copying of, selection of and/or printing of certain elements forming part of the network resource. The interaction of a user with a webpage can also include copying the URL of said network resource. As used herein "selection of" with respect to certain elements forming part of a network resource means a user interaction with a network resource such that a portion of said network resource is displayed differently to a user than the remainder. For example, programs capable of viewing a network resource, such as internet browsers, allow the selection of text by the user which results in the modification of the display of the text to the user. In one example colors of the text and its surrounding area may be inverted (e.g. white to black, black to white, etc.).

The detection of the copying of an URL may be implemented by various means. Typically, detection of copy events outside of the program environment of the network resource viewer (hereinafter "browser") requires implementation within the operating system of the user computer. Though possible, this presents a number of challenges, including interception of such programs by virus detection and protection software. In some embodiments, an ID can be uniquely generated on each access of the network resource by a user and inserted in the URL of a network resource which includes the user interaction detection software. Insertion can be made without otherwise interfering with accessing of the network resource by browsers and other programs. The URL which includes the uniquely generated ID can be detected by the computer hosting the network resource if the URL is used at some later time, and can then be correlated with a past access. Thus, the act of copying of an URL is not monitored, but the act of a user utilizing a copied URL is registered. It is contemplated as part of the present invention that the uniquely generated URLs may include as part of the URL an encoded measure of the time of the unique URL generation or the internet address of the user accessing the network resource. Such means of encoding are known in the art, using a reversible function, for example. It is contemplated in the alternative, that a database of uniquely URLs may be maintained, where the URLs are correlated to an encoded measure of the time of the unique URL generation or the internet address of the user accessing the network resource.

User Experience

User experience can be appreciated by considering an embodiment that involves a first user accessing a network resource using a network, such as the Internet, a second user and a network resource administrator (e.g. a website administrator) who receives information on the content viewed and/or copied by the first user. In the example, the first user initiates a copy-event when, for example, deciding to copy some content a network resource such as a web page. The user selects the content and uses the copy function of the computer or mobile device. The copy function may involve selecting a combination of keyboard keys, <<Ctrl C> or <Apple>C, for example) and/or may be initiated by selecting an option from a menu (e.g. right click and selects 'copy' command, chooses Copy from a main menu, etc). The user then pastes the content into a document in a word processing, email, note pad, or other application or tool. The originally selected content is then typically pasted and may optionally be augmented with additional information as specified by the owner of the site from which the copy is made. This additional information can include, for example, a link back to the original article, attribution text and so on. An example of this might be:
[content for which copying is requested]
  South Africa's problems, along with other factors like rising crime and relatively low pay, are pushing many physicians out. Some, like Dr. Craig Laurence, feel Canada's pull. In March, Laurence
[additional information]
  Click here to read the original article at http://www.calgaryherald.com/Alberta+bound+South+African+doctors+coming+Canada J1063582/story.html#ixzzOQvJ417Nx
  The Calgary Herald—Calgary's Best Source For News!
In this example, the additional information element WixzzOQvJ417Nx' represents a unique identifier ('ID") generated when the content is copied and which may be combined with the program of the present invention operating on the user computer and which can allow the highlighting of copied content when the URL present in the additional information is accessed. This is typically enabled by way of communication of the unique generated ID by the program of the present invention operating on a user computer, to a computer in network communication wherein:
  an agent/program according to certain aspects of the invention, which operates on a user computer, communicates the unique ID to a second computer in network communication with it;
  the second computer, which had received and stored the unique generated ID along with the content copied by the first user when the first user undertook the copy action, retrieves the content copied by the first user and communicates this to the second computer;
  the agent/program causes a user computer to then modify the network resource displayed to the second user such that the original content copied by the first user is identified by, for example, highlighting the originally copied content; and the agent/program of the present invention may cause the user computer to receive that information and then apply a highlighting or other format change to that element using the uniquely generated ID to identify which portion of the network resource was originally copied (such event generating the unique ID).

Continuing with the example, the second user uses the link optionally included in the additional information. Activating or otherwise using the link may cause web page to load with the copied content highlighted to allow the user to view the context. A web site manager/administrator for the site which provided the network resource, or other party interested in user interactions with the network resource may be informed directly by electronic communication of the existence of an interaction with the network resource. The collection, summarizing and electronic communication of a multiplicity of user interactions may be automated for access by a web site manager/administrator at some later time. Such data may comprise:

a. The number of times elements within the network resource are copied
b. The most copied elements within a web page
c. The number of times links generated as a result of appending information as part of a copy-event are then viewed by the same or different user as distinguished by their IP address
d. The geographic location of the user who undertook the copy-event
e. A "tag cloud" of most commonly copied elements in a time period According to certain aspects of the invention, the means of measuring relevance by other search engines, such as Google, may be indirectly benefited. Many search engines rely heavily on the number of reference links to a particular web page to calculate relevance of the particular web page in search results. That is, a web page that has a high number of sites referring or "linking" to it will appear higher in the search results. When interactions with elements within a web page or the URL of a web page occur, or when the page or URL is copied and pasted into a document that is not generally available within the network, the network resource subject to the user interaction or copying event loses the benefit of links back to their site capable of being identified by such search engines. Therefore, in certain embodiments, the act of interacting with a network resource can result in an automated publishing of the network resource URL in a form that it is available to the search engine as part of the communication from the user computer to another computer in network communication with the user computer. This feature permits a search engine to recognize user interaction with a network resource and thereby increase the quality of its searches.

Certain embodiments of the invention provide a method in which user interactions with an element within a network resource present in a network provides certain contextual and relevancy information with respect to the resource. User interactions can include, for example, copying, selecting or printing certain elements that form part of a network resource and/or copying the URL of the network resource. Network resources receiving a large number of user interactions by a multiplicity of users may be considered to contain information more relevant than other network resources with less user interactions. Alternatively, the presence of certain keywords within the elements with which a user interacts may be used to derive the context of the underlying network resource. Therefore the user interactions may be collectively utilized to increase the relevance of a resource present within a network when determining search results for a query. Certain aspects of the invention may be equally applicable to various networks including the Internet, intranets and local area networks.

In one example, the presence of specific keywords (e.g., "excellent", "good", "great", "bought," etc.) in text elements interacted with within a network resource (such as a web page) intended for on-line shopping, may be used to increase the relevance of the particular resource within an index of network resources. Various additional means of searching and/or indexing network resources are contemplated within the scope of the present invention; the relevance of network resources may be compared to other network resources which would be identified by a similar search or indexing method. Therefore, the utility of such analysis of the content of elements in a network resource and subject to a user interaction using presently disclosed systems and methods is applicable regardless of the underlying search system upon which the user interactions provide relevance information.

One skilled in the art will recognize that the content of the elements within a network resource subject to a user interaction can add additional information which may be utilized to obtain information with respect to the relevance of the underlying network resource, the context of the underlying network resource and/or other semantic information. In addition, the occurrence of a user interaction itself with respect to a network resource may provide relevant and useful information with respect to the underlying network resource, especially relative to other network resources that have received no user interactions. In one embodiment of the present invention, the number of user interactions with respect to a network resource may be utilized to increase the relevance of a given network resource among multiple search results.

In certain embodiments of the invention, the frequency of user interactions can be used to increase the relevance of a given network resource among multiple search results. The frequency of user interactions may be used to express the number of user interactions with a network resource over a given period of time, the number of users interacting with a network resource relative to the total number of users interacting with all monitored network resources or subset thereof and/or the number of user interactions with a network resource within a period of time relative to the total number of user interactions with all monitored network resources or a subset thereof within the same period of time.

The present invention is not limited to implementation with a particular network resource user interaction detection system. In one example, a detection system capable of identifying and communicating user interactions with a network resource maintains information related to the occurrence of an interaction, content associated with an interaction and/or particular terms contained within any text elements related to an interaction as part of the user interaction detection (Relevant User Interaction Information or "RUII") separate from the user computer. Typically, at least one computer acts as a central server. The central server may receive a query from a client program executed by a user computer, wherein the query may contain, at a minimum, the URL of the network resource being viewed on the user computer. The central server may then respond to the query as to whether there exist RUII associated with the URL of the network resource. The benefits of this particular structure, in particular with the method and system for increasing relevance of search results within a network, is the ability to collate, collect and/or scan RUII from a multiplicity of users with at least one computer acting as a centralized service provider.

It is contemplated that the present method and system for increasing relevance of search results within a network may be implemented with other user interaction detection systems. For example, those user interaction detection systems based upon storage of user interaction information for network resources in a distributed manner including, for example, when the user interaction information for network resources for a given user is maintained within that user's computer or immediate computer network. In such a case, it may be necessary to query the distributed user interaction detection systems for the existence of RUII associated with a particular network resource (by use of, for example, a URL) as well as other information. In some embodiments, the user interaction detection systems may be queried for solely the existence RUII. In one embodiment employing a distributed user interaction detection system, the distributed systems may be queried on an intermittent basis, with the results collected and maintained at a central results server. A protocol may be employed that reduces query time upon receipt of search results (i.e., the time needed to determine whether any user interactions are associated with network resources identified with the search results), avoiding the requirement to query a multiplicity of distributed user interaction detection systems each time search results are received.

In one embodiment, the user interaction detection system is based upon a RUII server in network communication with a user computer, whereby the RUII server receives RUII from a client software application running on the user's computer. The system may store the RUII of a user and may optionally store the RUII together with formatting information which may localize the user interaction within the network resource, on a RUII server separate from the web server hosting the network resource.

FIG. 1 is a schematic showing the relationship between user computer 103 containing user interaction detection client software, and RUII server 102, wherein a portion of a network resource 101 (e.g., a web page) is subject to a user interaction by the user on user computer 103. It is contemplated that user interaction may be with a variety of network resources, including with application specific documents, video content, audio content and/or databases. The communication between user computer 101, RUII server 102 and network resource 101 may be provided through a network 104 (e.g., the Internet). In the example of the user interaction detection system depicted, the RUII server 102 communicates with user computer 103 through a client program within user computer 103, where the client program is in network communication with RUII server 102.

The user interaction detection software may be resident on the user computer, operating either in conjunction with a program or in an environment within a program capable of accessing and displaying network resources and interpreting and effecting computer-readable instructions, including, but not limited to instructions written in Java®, JavaScript, or programming instruction languages particular to a certain web browser, etc. Installation of the user interaction detection software may be performed by a user such that the software is normally resident upon the computer and is available to the user upon each use of systems, modules or agents that access or display network resources for a user (e.g., a web browser).

Figure 2:
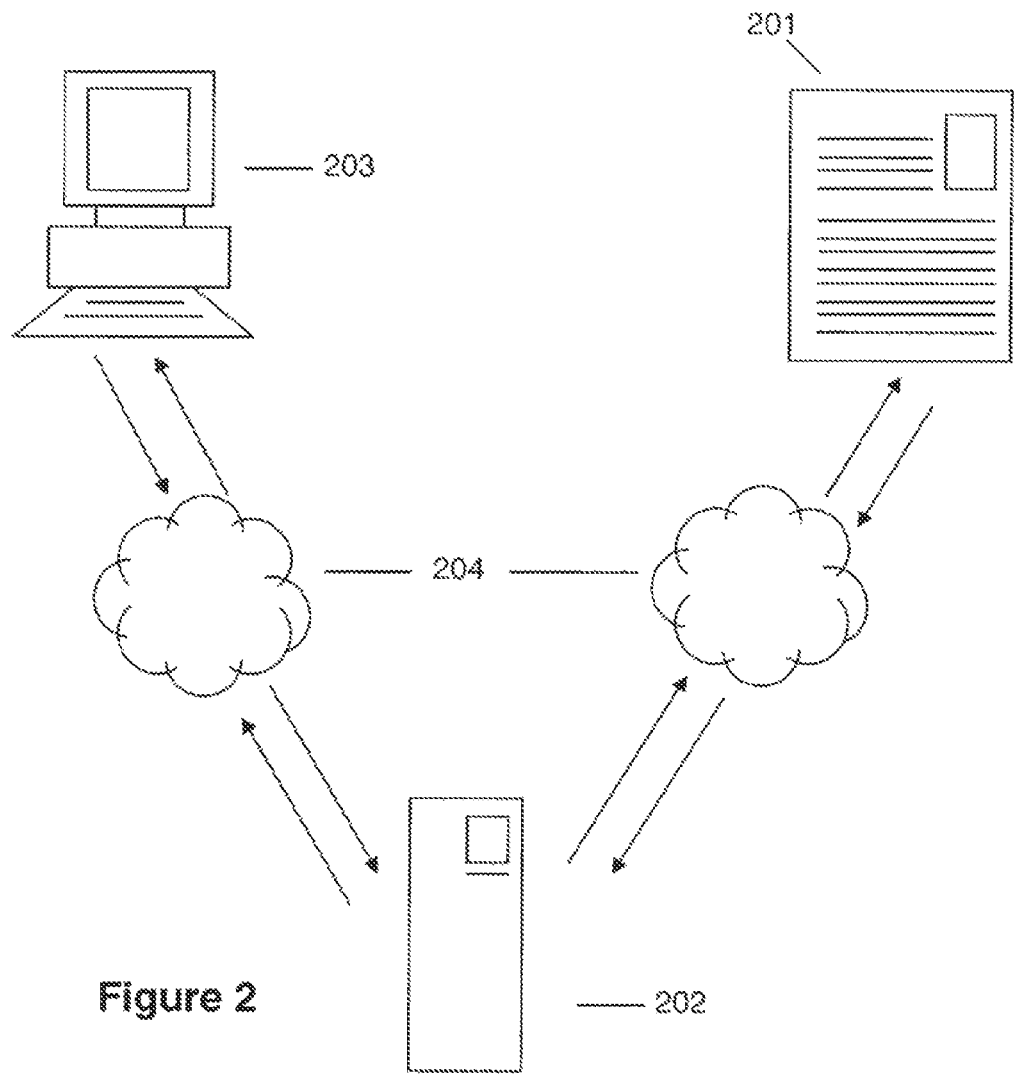
FIG. 2 shows one example of delivering user interaction detection software to the user computer according to certain aspects of the invention.

In certain embodiments, user interaction detection components may be delivered as software, agents, tools, etc. by means of a network proxy, as depicted in FIG. 2. In this example, the user interaction detection client component may run within the network browser environment (e.g., via JavaScript), and may be loaded on a per-page basis using a proxy server. In this example, user computer 203 may seek access to network resource 201, wherein the access to network resource 201 is routed through proxy server 202, with proxy server 202 accessing network resource 201. User computer 203, network resource 201 and proxy server 202 may all be in network communication through a common network 204 such as the Internet, for example. Network resource 201 may be obtained by proxy server 202 and passed on to user computer 203, together with computer software capable of interpretation and operation within the user computer 203. The software may comprise instructions and or code that, when executed by a processor, implements the processes and functions described and contemplated as the present invention, including the detection of user interactions with a network resource and communication of RUII as more fully described herein.

Proxy server 202 typically communicates only user interaction detection software code prior to, or following, transmission of the originally requested network resource 201. The user interaction detection software then may be executed within the program operating on user computer 203 that is responsible for the accessing and display of network resource 201.

Figure 3:
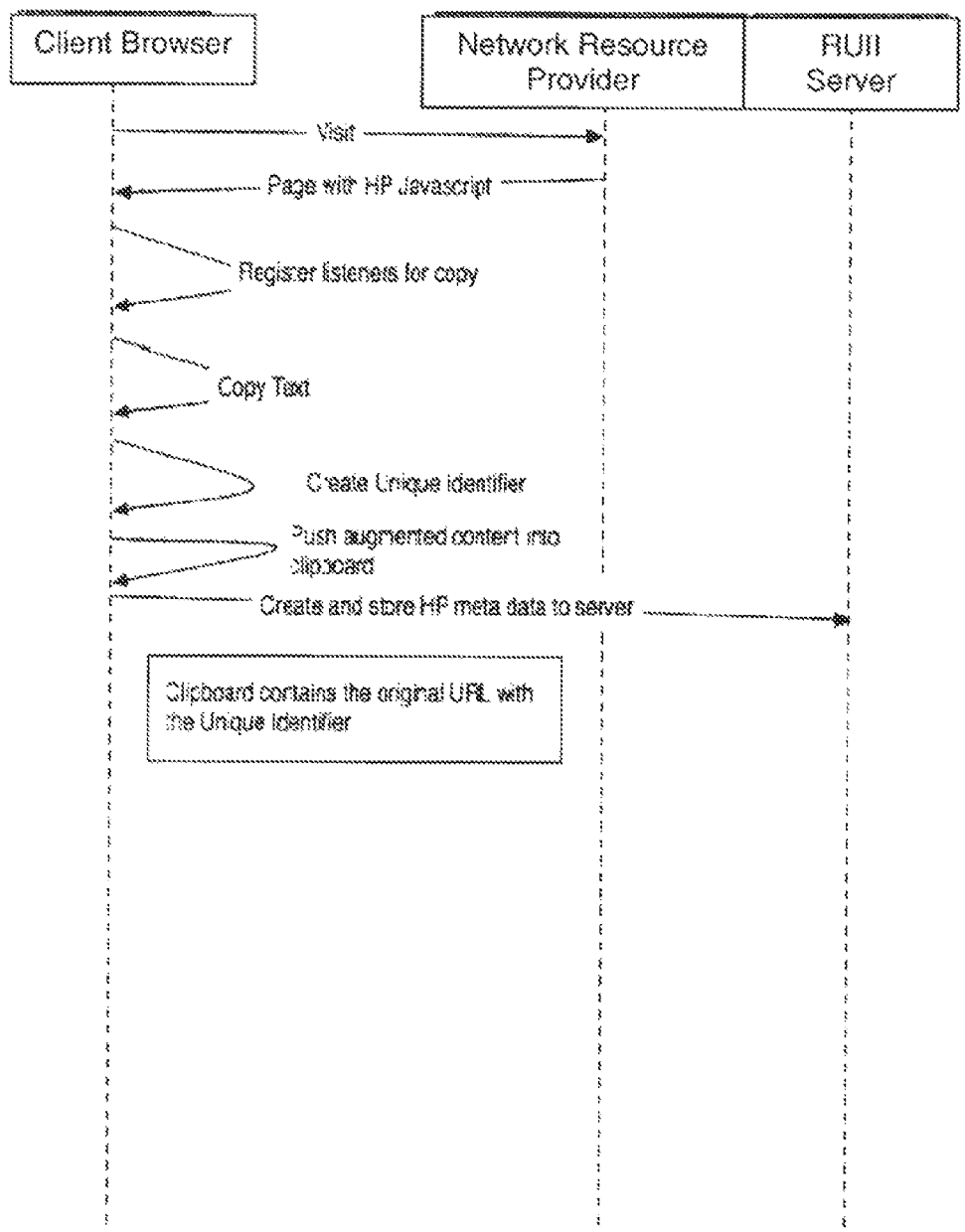
FIG. 3 shows a schematic of the communications flow between the Network Resource Provider (for example, web page) the user client software (Client Browser) and the RUII server upon accessing a network resource according to certain aspects of the invention.

FIG. 3 illustrates an embodiment of the communication process by which the client software present on the user computer ("Client Browser") may provide information on user interactions to the RUII server. Each network resource may carry with it a unique page identifier, for example a URL, which may be used for cataloguing RUII associated with the network resource. As the network resource is accessed on the user computer, client software (Client Browser) may communicate the page identifier to the RUII server, optionally together with a unique identifier code for the user computer and/or for the client software (user 10). Software code capable of being executed on the user computer or within a program on the user computer, such as a client browser, for implementing for altering and reporting the occurrence of the user interactions contemplated by the present invention ("HP Javascript") may be provided by the network accessible computer providing the network resource ("Network Resource Provider") as presented in FIG. 3. Alternatively, the HP Javascript may be obtained from a computer other than the Network Resource Provider, including the RUII Server or other network accessible computer (not pictured) via a direction given by the Network Resource Provider to the Client Browser.

Optionally, other information ("supplemental information") may be communicated to the client for presentation to the client through the client browser. Supplemental information may include general information considered to be of relevance to the particular network resource being viewed, an annotation associated with the network resource and/or a given user ID. In one example, supplemental information may include an advertisement expected to be relevant to the user. In another example, supplemental information may include a link to an alternative network resource. Following the user interaction, if optional supplemental information has been received by the client, the supplemental information may be rendered together with the network resource for the user to view. Further, the substance and form of the supplemental information may be determined by the RUII, under direction of the RUII server or another computer in network communication with the user computer.

Figure 4:
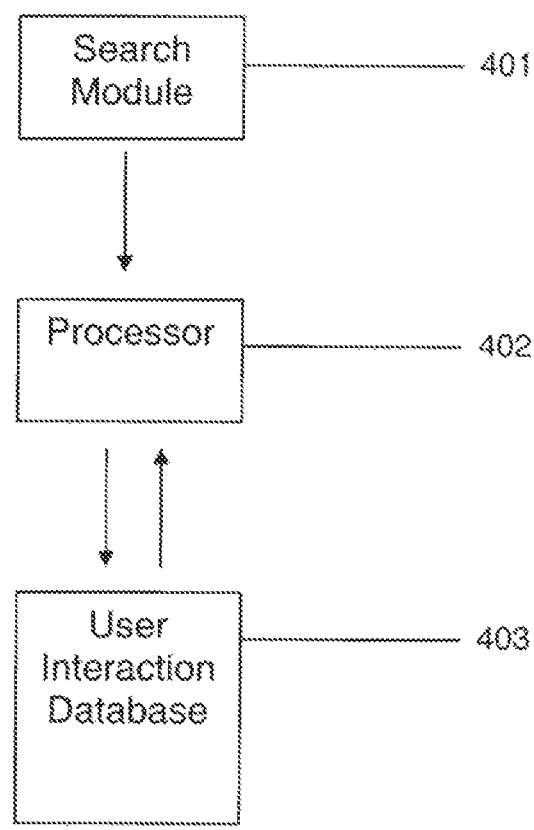
FIG. 4 shows a schematic of the communications flow for increasing the relevance of search results RUIIs according to certain aspects of the invention.

As shown in FIG. 4, it is contemplated that a processor module 402 integrate data obtained from search results received from a search module 401. It further is contemplated that user interaction database module 403 provide RUII to processor module 402 thereby enabling processor module 402 to modify the search results received so as to increase or decrease the relevance of a network resource within the search results. It is contemplated that search module 401 can be implemented either as a search engine accessible primarily by users of a user interaction detection system, or alternatively may be a search engine otherwise available to the public including, for example, search engines provided by Google® or Yahoo®. In one embodiment, the search engine may be any search engine preferred or desired by a user, with the search results generated by said search engine (I.e., search module 401) directed into processor module 402 for relevance sorting using data obtained from user interaction database module 403 which contains all or portions of the user interactions of a multiplicity of users on a multiplicity of network resources. Following relevance sorting, the search results, optionally re-ordered due to the increase or decrease of relevance of particular network resources contained within the search results, may be displayed to the user. In one embodiment, the user may choose between viewing the search results\ in their original order as obtained from search module 401, or the potentially modified search results arising from processing using the user interaction database.

Figure 5:
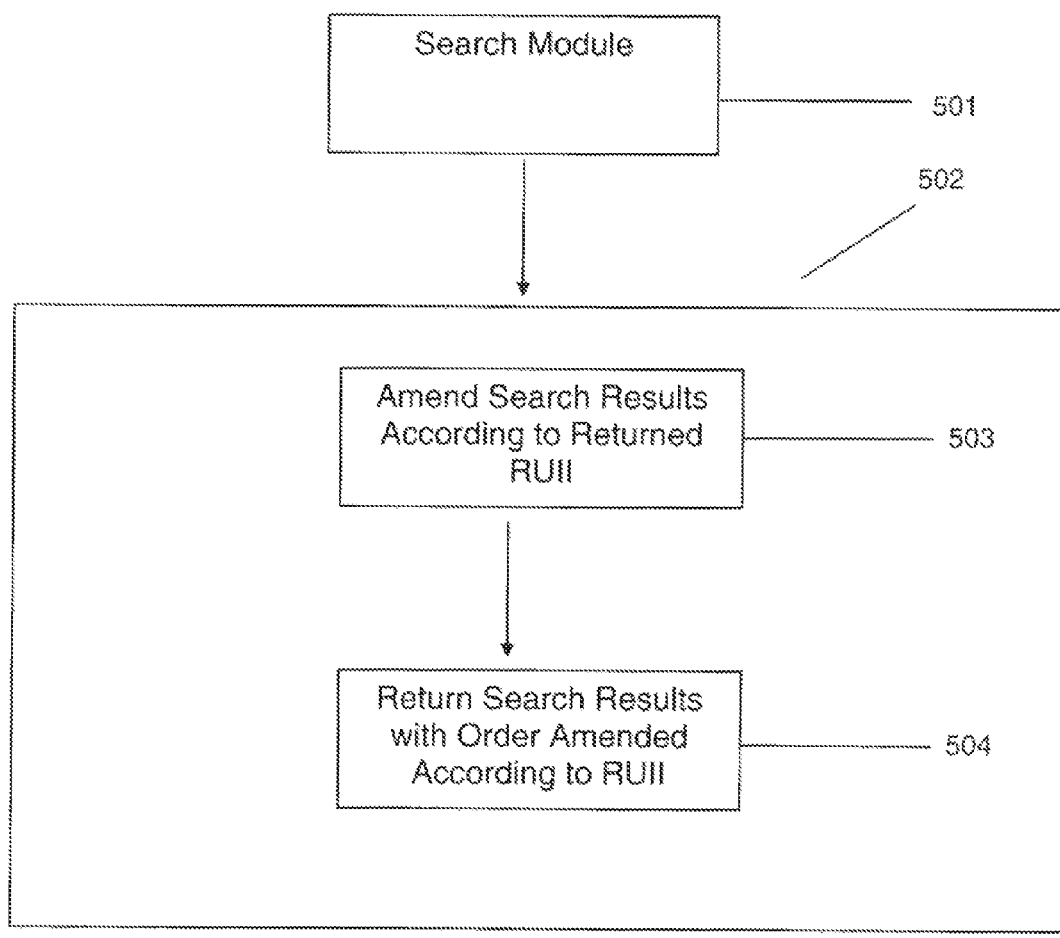
FIG. 5 is a schematic showing details of the communications flow for increasing the relevance of search results using RUIIs according to certain aspects of the invention.

FIG. 5 shows a summary of a process that may be used within the processor module 402, as depicted in FIG. 4. Search results 501, corresponding to module 401 depicted in FIG. 4, may be imported into processor module 502, corresponding to module 402 depicted in FIG. 4. Sub-module 503 may amend the order of the search results according to information obtained from the user interaction database, which information may either increase or decrease the relevance of a network resource (and therefore, perhaps, the position within the ordered list of search results 501). Submodule 504 may then return the amended search results to the user.

Figure 6:
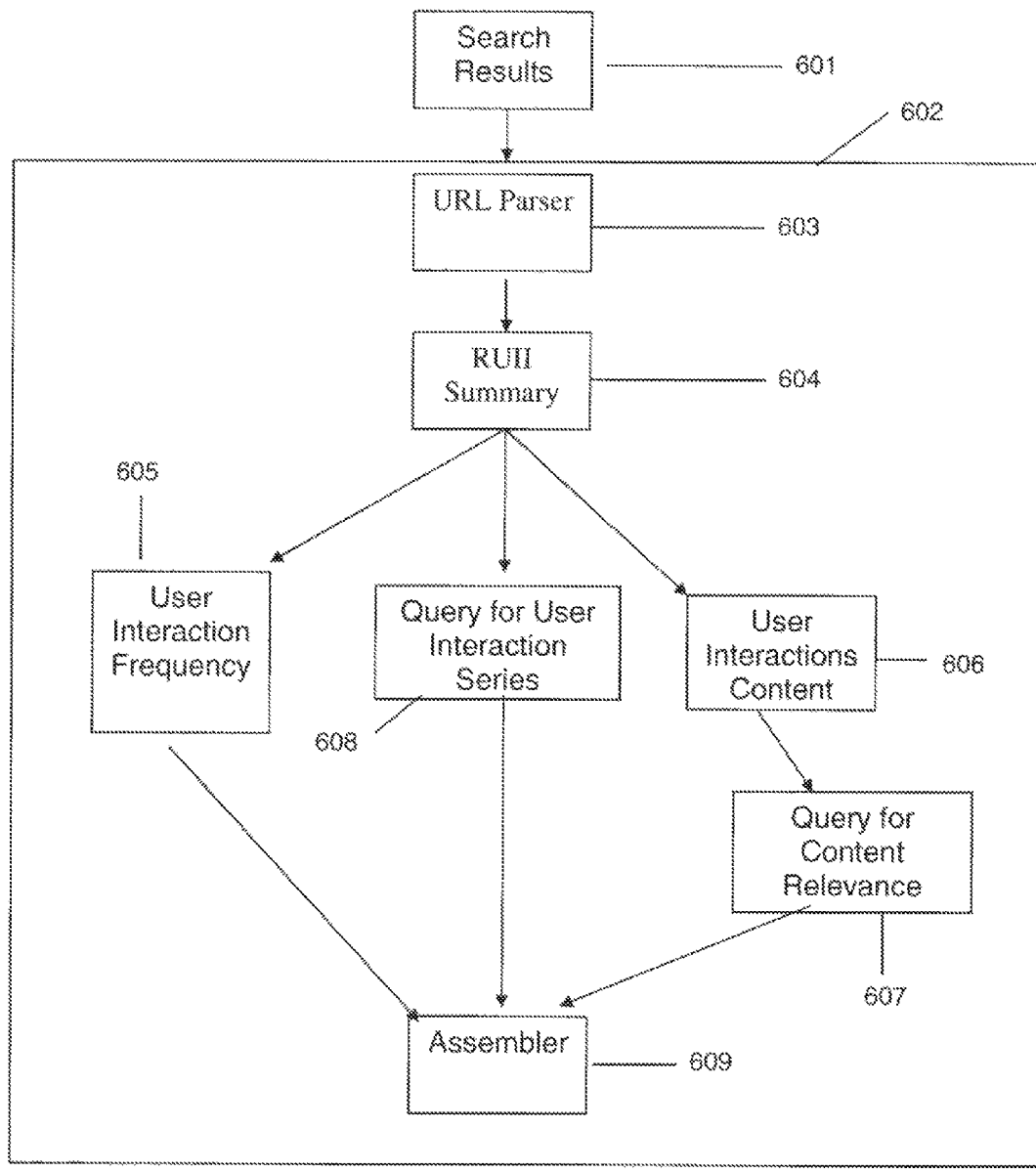
FIG. 6 is a schematic showing details of communications flow for increasing the relevance of search results using RUIIs according to certain aspects of the invention.

FIG. 6 shows further detail of the processing module 602, which previously was depicted as 402 in FIG. 4 and as 502 in FIG. 5. Search results 601 may be received into processing module 602 where they may be processed by sub-module 603, where the URL for each network resource forming the search results is reduced to a basic structure and compared to user interaction database to determine if RUII exist within the database for any of the URLs. By reducing a URL to a basic structure, it is contemplated that the URL is stripped of superfluous information not relevant or otherwise present in the copy event database. As an example of reducing a URL to its basic structure consider the following URLs:

1) examplesite.com/page1?cust=4,
2) examplesite.com/page1#anchor2, and
3) examplesite.com/page1#anchor2.

In this example, the basic structure of the URL may be examplesite.com/page1.

In one embodiment, the user interaction database may contain RUII made by plural, and/or all users of the user interaction detection system, which RUII may each be paired to a unique identifier for the network resource upon which the copy event was made. In certain embodiments, the user interaction database may be limited to a subset of RUII including, for example, RUII made by a particular user, a group of users of similar demographics, a group of users of similar geographic location, a group of users of similar language, a group of users of similar nationality, a group of users of similar employer, and so on. It is contemplated that any unique identifier for network resources may be used, and a functional equivalent of the URL parser used for each type of unique identifier of network resources.

When the URLs have been reduced into a basic structure and compared to the user interaction database, any RUII for the URLs within the search results may be assembled and summarized (604). It will be appreciated that the summary process may take many forms, with the goal to assess whether a RUII associated with a URL within the search results increases, or decreases, the relevance of that URL within the search results, which may in turn cause the network resource associated with that URL to be placed nearer to the top of the list of search results.

In certain embodiments, the presence of a RUII within the user interaction database associated with a given URL may indicate that a URL has increased relevance ("interaction frequency"). Furthermore, URLs with more RUII associated with them may be deemed more relevant than URLs with fewer RUII.

In certain embodiments, the content of the RUII associated with URLs may be used to determine if there exists certain terms within elements identified with an interaction with a network resource that may be associated with increased relevance of a particular URL ("content relevance").

In certain embodiments, the action of the user interacting with multiple elements within a particular network resource, resulting in multiple RUII from a single user on a particular URL, including user interactions with combinations of text and images or combinations of text, either as part of a single operation or a series of user interactions can provide information with respect to the relevance of given network resources ("user interaction series relevance"). For the purposes of this description, a series of user interactions can be considered to comprise at least two user interactions occurring with respect to the same network resource, by the same user or client browser. The identification of user interactions as originating from the same user computer may be approximated through comparison of IP addresses at the time of the executing of a user interaction, or through other suitable means of identifying users, many of which are known in the art. For example, one method of identification includes user login information submitted in order to access a network resource. In another example, identification may be made by transmission to the client computer of a unique data identifier detectable at a later time (e.g. a "cookie" as is known in the art).

A series of user interactions by or on behalf of a single user may be used to derive associations between content within the page, providing additional user interaction series relevance. In one example, the act of a user interacting with more than one element within a single network resource may indicate that the user determined or considered the content elements to be related and/or relevant to each other. For example, if at least one of the content elements contains text and at least one other content element contains a non-textual content (including, for example, a video resource or image) the text ("contextual data") may be associated with the nontextual content for the purposes of searching, including relevance. It is contemplated that each element subject to a user interaction as part of a series of user interactions by a user, communicated to, and stored by, the user interaction database can provide context for each of the other elements. It will be appreciated that the contextual data may comprise the entire text forming the copied element and/or may comprise key words identified within the text forming the copied element. Keywords may be selected using a dictionary of words or phrases determined to be relevant.

In certain embodiments, user interaction frequency and the presence of positive relevance data within RUII may together be used to increase the relevance of a particular network resource as among multiple search results. As shown in FIG. 6, sub-module 605 may assess the user interaction frequency, while sub-modules 607 and 608 may determine the presence of content relevance and user interaction series relevance, respectively, where sub-module 608 may be under the control of sub-module 606 which optionally parses textual content for interrogation by sub-module 608. The output of sub-modules 605, 607 and 608 may be received by assembler sub-module 609, which may weigh the outputs, and accordingly may increase or decrease the relevance of a given network resource within the list of search results. Assembler sub-module 609 may then provide to the user the list of search results, optionally reordered according to the relevance information.

In certain embodiments, the ordering within an ordered list of search results may be altered in order to place network resources with higher relevance closer to the top of the list. The ordered list may be maintained in its original state and a relevance "score" or weighting value can be applied to each network resource within the ordered list of search results. The weighting value or score may be displayed in association with the ordered list of search results, or alternatively may be displayed in a graphical fashion by, for example, color-coding, bolding, using a different font, etc.

The various systems, modules, etc. described herein may each include a storage component for storing machine-readable instructions for performing the various processes as described and illustrated. The storage component may be any type of machine-readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer-readable) storing medium. Each computer system, as will be illustrated in more detail below, may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

System Description

Figure 7:
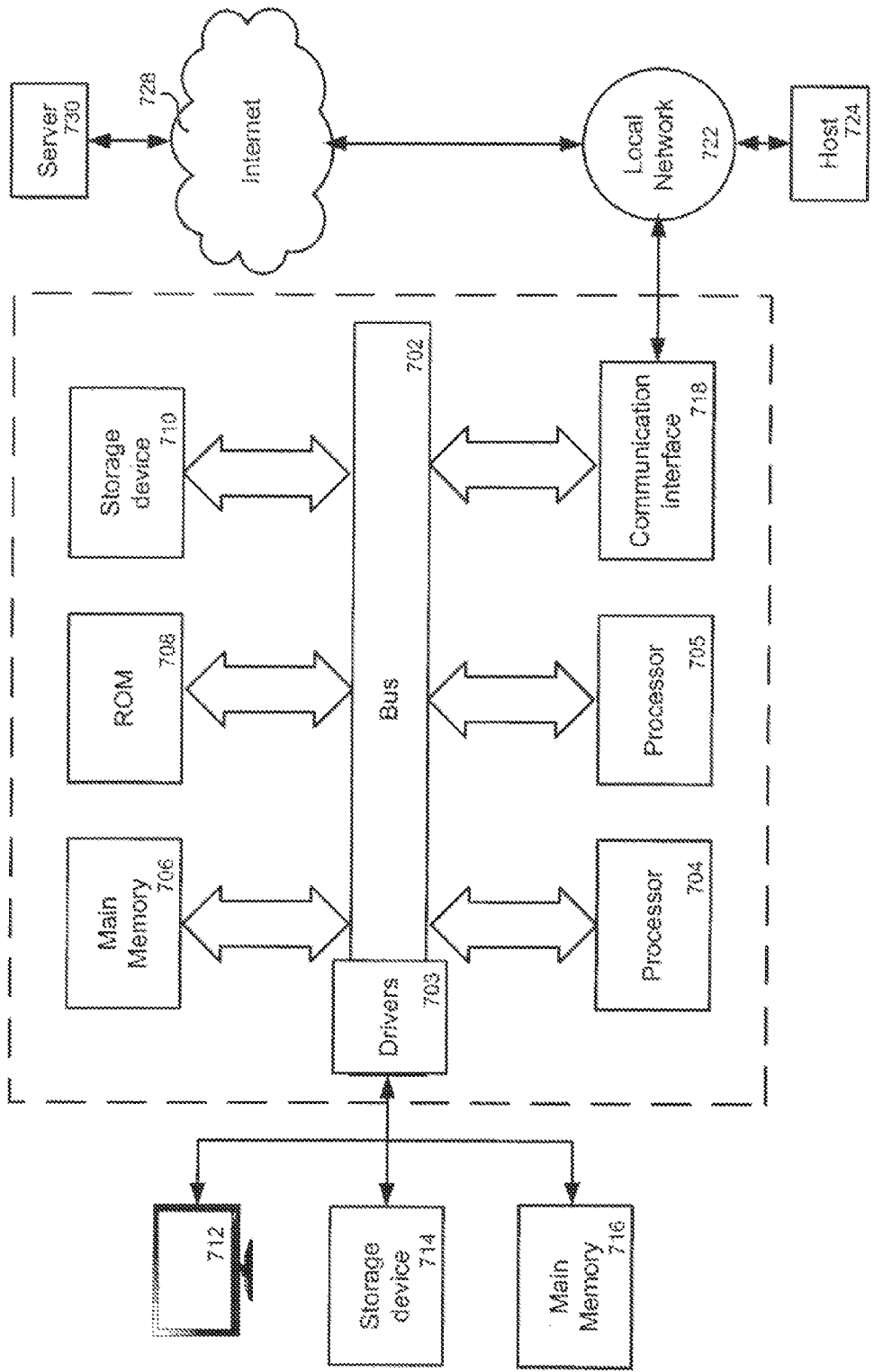
FIG. 7 is a simplified block schematic illustrating a processing system employed in certain embodiments of the invention.

Turning now to FIG. 7, certain embodiments of the invention employ a processing system that includes at least one computing system 700 deployed to perform certain of the steps described above. Computing systems may comprise a commercially available system that executes commercially available operating systems such as Microsoft Windows®, UNIX or a variant thereof, Linux, a real time operating system and/or a proprietary operating system. The architecture of the computing system may be adapted, configured and/or designed for integration in the processing system, for embedding in one or more of an image capture system, a graphics processing workstation, a desktop or laptop computer, a server and/or a mobile device including cellular and other telephones, PDAs, smart phones and the like. In one example, computing system 700 comprises a bus 702 and/or other mechanisms for communicating between processors, whether those processors are integral to the computing system 70 (e.g. 704, 705) or located in different, perhaps physically separated systems. Device drivers 703 may provide output signals used to control internal and external components.

Computing system 700 also typically comprises memory 706 that may include one or more of random access memory ("RAM"), static memory, cache, flash memory and any other suitable type of storage device that can be coupled to bus 702. Memory 706 can be used for storing instructions and data that can cause one or more of processors 704 and 705 to perform all or a portion of a desired process or method. Main memory 706 may be used for storing transient and/or temporary data such as variables and intermediate information generated and/or used during execution of the instructions by processor 704 or 705. Computing system 700 also typically comprises non-volatile storage such as read only memory ("ROM") 708, flash memory, memory cards or the like; non-volatile storage may be connected to the bus 702, but may equally be connected using a high-speed universal serial bus such as USB, Firewire, SATA or other such bus that can be coupled to bus 702. Non-volatile storage can be used for storing configuration, and other information, including instructions executed by processors 704 and/or 705. Non-volatile storage may also include mass storage device 710, such as a magnetic disk, optical disk, flash disk that may be directly or indirectly coupled to bus 702 and used for storing instructions to be executed by processors 704 and/or 705, as well as other information.

Computing system 700 may provide an output for a display system 712, such as an LCD flat panel display, including touch panel displays, electroluminescent display, plasma display, cathode ray tube or other display device that can be configured and adapted to receive and display information to a user of computing system 700. Typically, device drivers 703 can include a display driver, graphics adapter and/or other modules that maintain a digital representation of a display and convert the digital representation to a signal for driving a display system 712. Display system 712 may also include logic and software to generate a display from a signal provided by system 700. In that regard, display 712 may be provided as a remote terminal or in a session on a different computing system 700. One or more input device 714 is generally provided locally or through a remote system and typically provides for alphanumeric input as well as cursor control 716 input, such as a mouse, a trackball, etc. It will be appreciated that input and output can be provided to a wireless device such as a PDA, a tablet computer or other system suitably equipped to display the images and provide user input. It will be appreciated that device drivers may be modified and/or interfaces to device drivers may be provided that permit interception of user input as described above.

According to one embodiment of the invention, at least a portion of the functions described above can be performed by a computing system 700. Processor 704 executes one or more sequences of instructions. For example, such instructions may be stored in main memory 706, having been received from a computer-readable medium such as storage device 710. Execution of the sequences of instructions contained in main memory 706 causes processor 704 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 704 and/or 705, particularly where the instructions are to be executed by processor 704 and/or 705 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 704 and 705 or remotely, typically by use of network connection. Non-volatile storage may be removable from computing system 704, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 700. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 704 and/or 705. For example, the instructions may initially be retrieved from a magnetic disk of a remote computer and transmitted over a network or modem to computing system 700. The instructions may optionally be stored in a different storage or a different part of storage prior to or during execution.

Computing system 700 may include a communication interface 718 that provides two-way data communication over a network 720 that can include a local network 722, a wide area network or some combination of the two. For example, an integrated services digital network (ISDN) may be used in combination with a local area network (LAN). In another example, a LAN may include a wireless link. Network link 720 typically provides data communication through one or more networks to other data devices. For example, network link 720 may provide a connection through local network 722 to a host computer 724 or to a wide area network such as the Internet 728. Local network 722 and Internet 728 may both use electrical, electromagnetic or optical signals that carry digital data streams.

Computing system 700 can use one or more networks to send messages and data, including program code and other information. In the Internet example, a server 730 might transmit a requested code for an application program through Internet 728 and may receive in response a downloaded application as described in the examples above. The received code may be executed by processor 704 and/or 705.

Example: Action Rank Measure of Engagement on Web Pages

Examples of web-based searches are described. Websites with thousands of web pages are commonplace and such websites include blogs (e.g. typepad.com), online publishing (e.g. nydailynews.com) and advertisement websites (e.g. kijiji.com). Conventionally, domain searches are used to find the information of interest in such sites. Most search engines have no problem at identifying related pages, but ranking them is usually difficult because, traditionally, search engines exploit the linkage structure of the web pages to assign authorities to web pages and to rank them based on their authority values (e.g., Page Rank and Authority and Hub). This method fails under some circumstances, including where contents are posted by registered users with very few hyperlinks on their web pages (e.g. blogs) and where most recent pages are more important than older pages (e.g. newspaper). In the latter case, links may have not been developed yet. For the purposes of illustration, a novel measurement of user engagement on web pages (referred to here as "Action Rank") can be employed in these types of sites. The advantage of this measurement is that it does not rely on any linkage or content information of the webpages. Action Rank is based on user actions on web pages, including views, selections and copies as described above. It is demonstrated that top results returned by Action Rank are more recent and relevant.

Figure 8A:
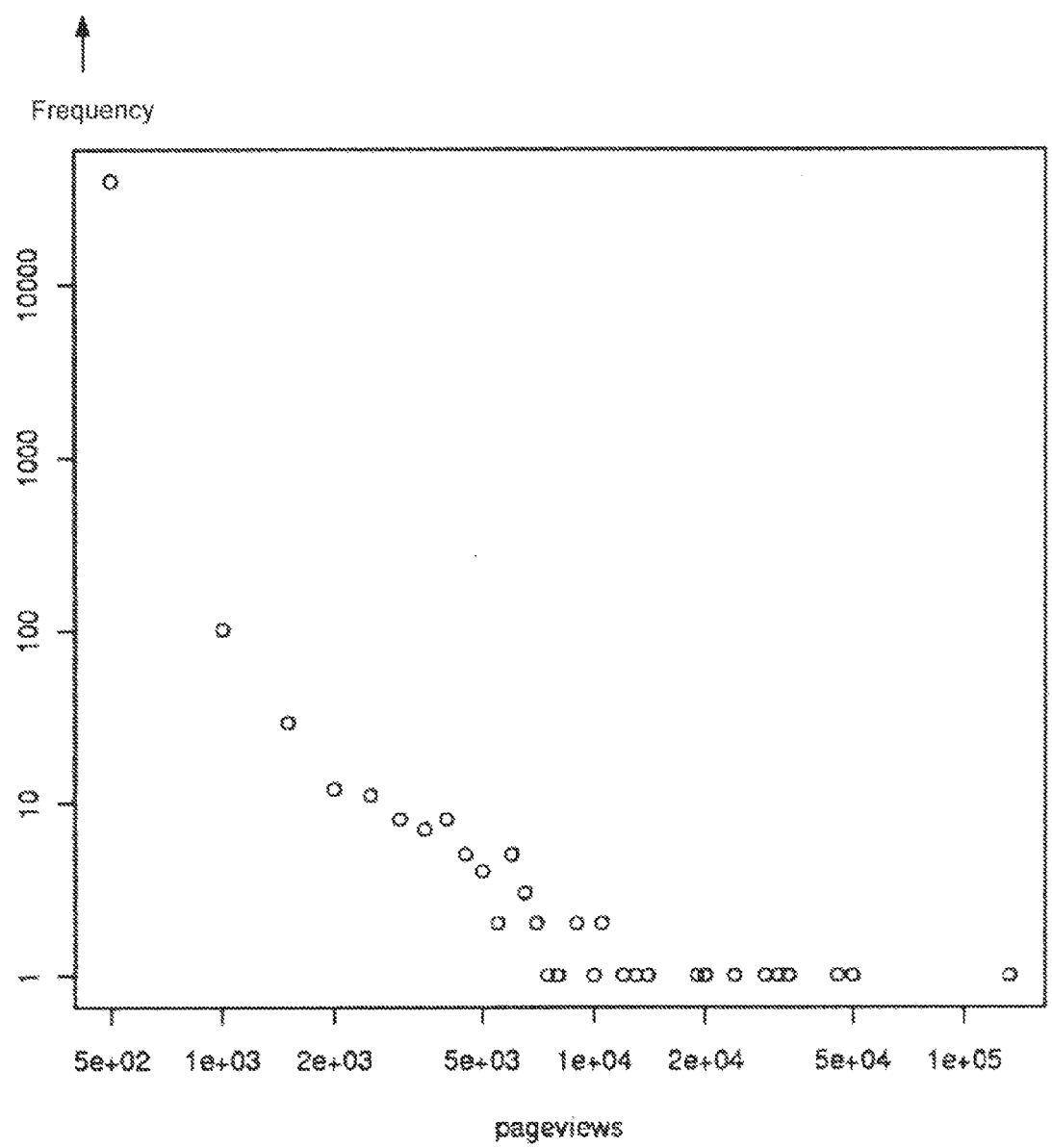
FIGS. 8A-8C show examples of power-law distribution.
Figure 8B:
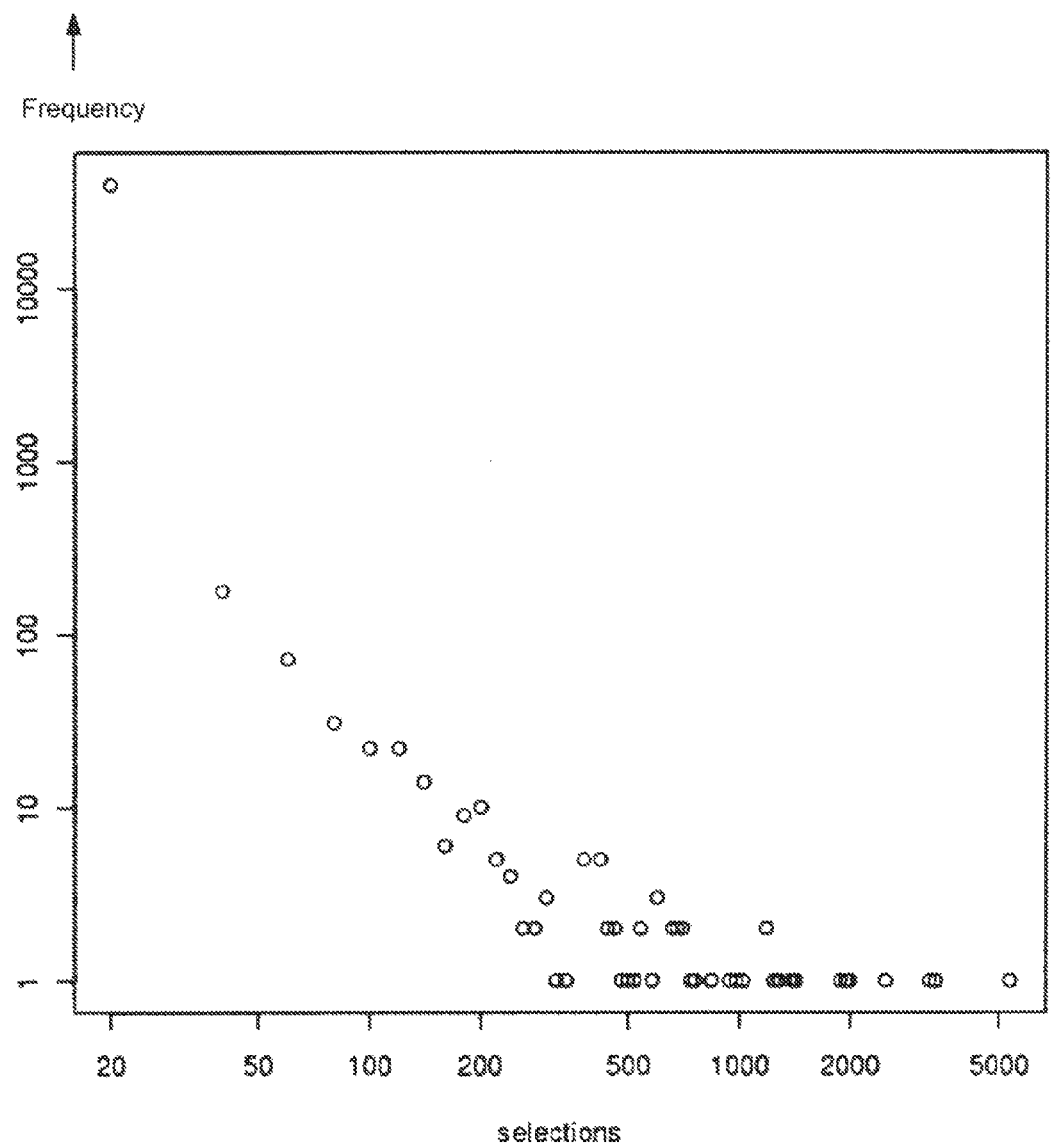
Figure 8C:
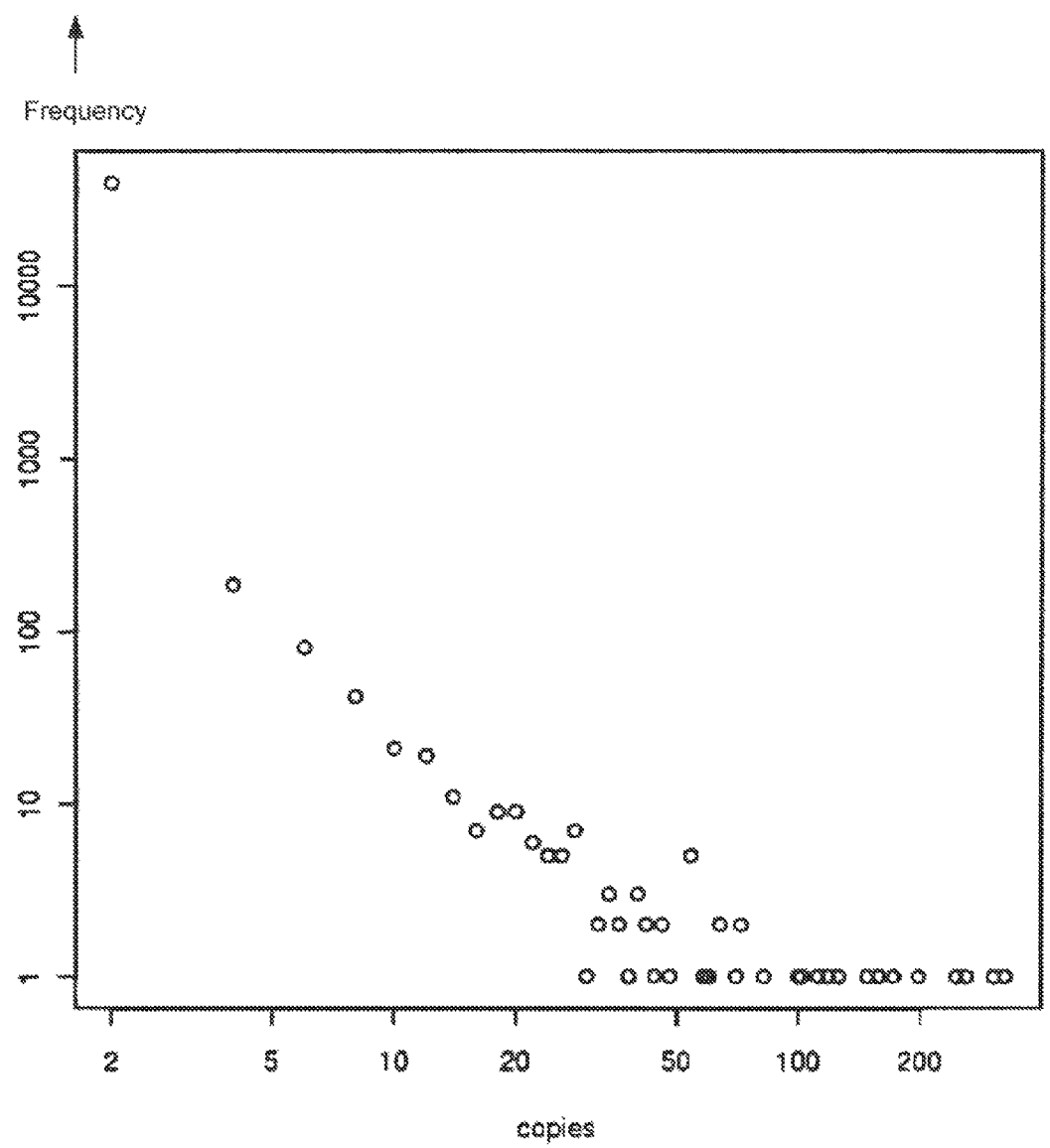

Results depicted in FIGS. 8A-8C, show that the number of page views (FIG. 8A), selections (FIG. 88) and copies (FIG. 8C) on web pages follow power-law distribution. The equation of power-law distribution may be written:

$$P(x)=Cx-a,$$

where:

x is the raw measurement (e.g. 100 pageviews),
P(x) is the probability of x (e.g. the probability of a random page having 100 pageviews), and C and a are data-dependent parameters.

In one embodiment, Action Rank is computed for a webpage in three steps. For the purposes of this discussion, a web page is assumed to have 1000 page views, 100 selections and 10 copies. First, Eq. 1 transforms raw metrics x to probabilities p(x). For the web page, the probability of its page view is:

$$P(1000)=C_{views}*1000^{-a\ views}$$

Similarly, selections and copies can be transformed as:

$$P(100)=C_{selections}*100^{a\ selections}$$

$$P(10)=C_{copies}*10^{-a\ copies}$$

It will be appreciated that probabilities become smaller as the raw metrics increase. It is the nature of probability (the probability of a random webpage having 1000 pageviews is smaller than it having 100 page views). However, the final Action Rank score provides web pages with more actions with larger values. Accordingly, the second step includes creating an inverse of the probabilities:

$$f(x) = \frac{p(\min) - p(x) = C*\min^{-\alpha} - C*x^{-\alpha} = \min^{-\alpha} - x^{-\alpha}}{p(\min) - p(\max) = c*\min^{-\alpha} - c*\max^{-\alpha} = \min^{-\alpha} - \max^{-\alpha}}$$

At least one action is required in most cases, and thus:

$$f(x) = \frac{1 - x^{-\alpha}}{1 - \max^{-\alpha}}$$

Finally, the three actions are combined by multiplying the values together:

$$AR(x_{views}, x_{selections}, x_{copies}) = f(x_{views}) * f(x_{selections}) * f(x_{copies})$$

$$= \frac{1 - x_{views}^{-\alpha_{views}}}{1 - \max\_views^{-\alpha_{views}}} *$$

$$\frac{1 - x_{selections}^{-\alpha_{selections}}}{1 - \max\_selections^{-\alpha_{selections}}} *$$

$$\frac{1 - x_{copies}^{-\alpha_{copies}}}{1 - \max\_copies^{-\alpha_{copies}}}$$

In the example, the Action Rank is:

$$= \frac{1 - 1000^{-\alpha_{views}}}{1 - \max\_views^{-\alpha_{views}}} * \frac{1 - 100^{-\alpha_{selections}}}{1 - \max\_selections^{-\alpha_{selections}}} * \frac{1 - 10^{-\alpha_{copies}}}{1 - \max\_copies^{-\alpha_{copies}}}$$

where the maxima are domain-dependent, which ensures that for small domains with limited traffic, some of their web pages can still get relatively high Action Ranks The only unknown parameters in the above equation is the three a, which can be obtained by fitting the data into power law distribution. Using the R function given by Eq. 1, the optimal a for nydailnews.com in the table below:

| Date | $\alpha_{views}$ | $\alpha_{selections}$ | $\alpha_{copies}$ |
|---|---|---|---|
| 2009-05-24 | 1.7 | 1.8 | 1.98 |
| 2009-05-25 | 1.68 | 1.8 | 1.98 |
| 2009-05-26 | 1.71 | 1.82 | 2.02 |
| 2009-05-27 | 1.68 | 1.76 | 1.9 |
| 2009-05-28 | 1.69 | 1.67 | 1.92 |
| 2009-05-29 | 1.71 | 1.72 | 1.94 |
| 2009-05-30 | 1.69 | 1.68 | 1.94 |
| median | 1.69 | 1.76 | 1.94 |

As can be seen from this example, the parameters are quite stable across days, so the medians (1.69, 1.76, 1.94) can be used for computation purpose.

ActionRank in Ranking Search Results

Figure 9:
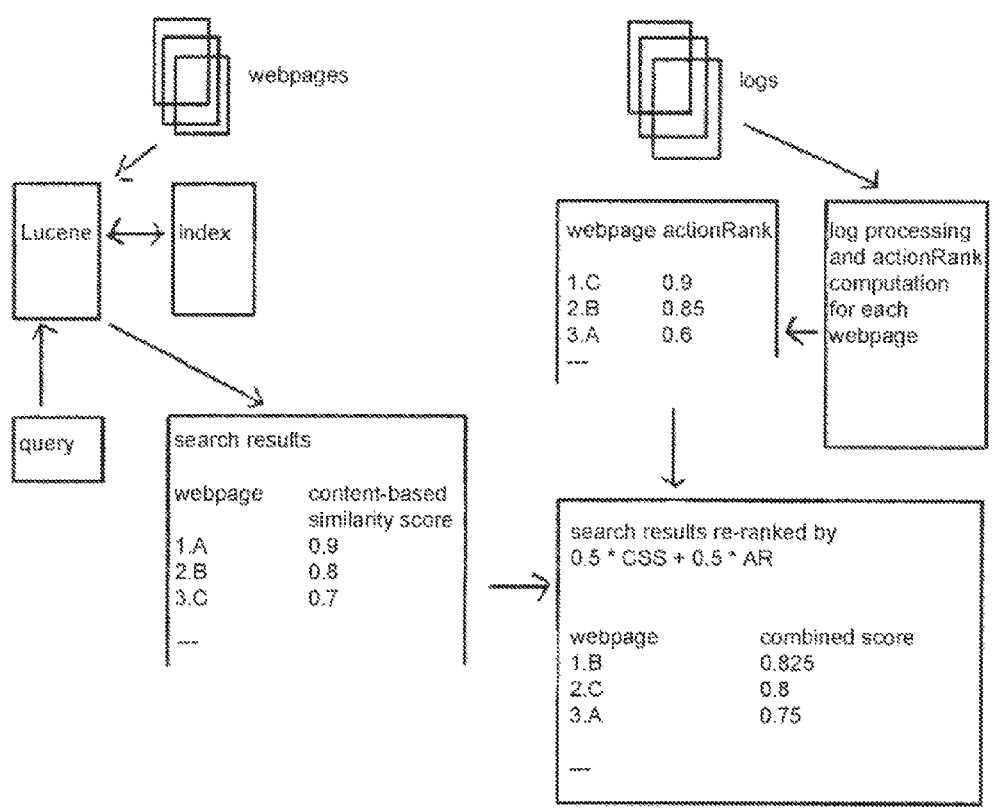
FIG. 9 is a process flow employed in one embodiment of the invention.

To demonstrate how Action Rank can be used to improve search results, a search engine based on Apache Lucene can be used to download all the web pages from a target site (here, nydailynews.com), which were viewed at least once on Aug. 25, 2009. These web pages are indexed as a search pool, and for each web page, an Action Rank is computed based on the actions received on Aug. 25, 2009. Lucene has a built-in content-based search scheme, which is a modified version of TFIDF. When returning the search results, it provides not only a list of related web pages, but also the scores which measure their content-based similarity to the query. This list can be used for each page to combine the page Content-based Similarity Score (CSS) given by Lucene and its pre-computed ActionRank score (AR) as follows:

$$CS(w) = \beta * CSS + (1-\beta) * AR$$

where is a tunable parameter, which controls how much weight each score should be given. Based on the new Combined Score (CS), the list given by Lucene can be reranked. This process is illustrated in the FIG. 9.

Figure 10:
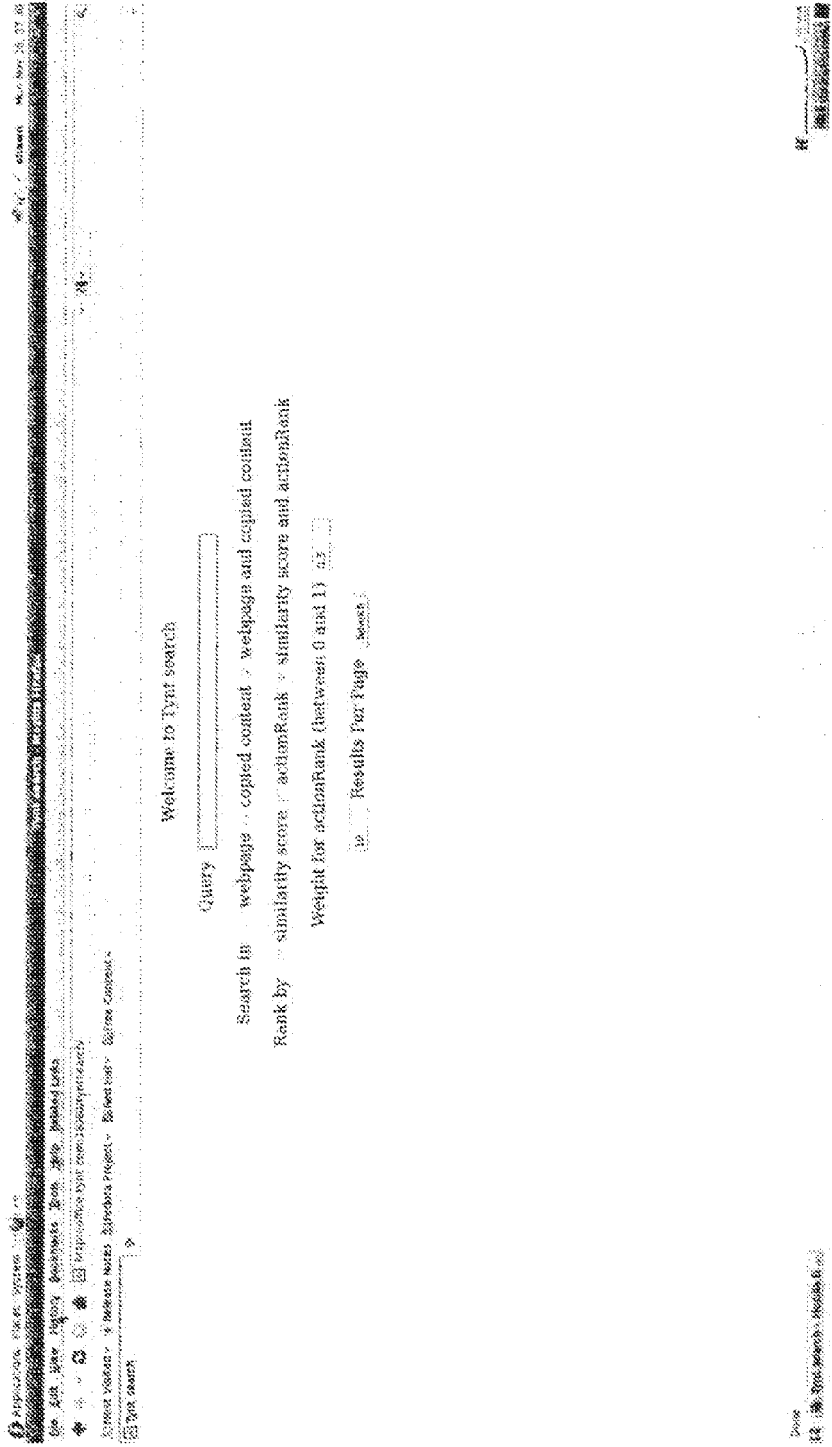
FIGS. 10, 11 A, 11 B, 12A and 12B are screenshots obtained from one embodiment of the invention.
Figure 11A:
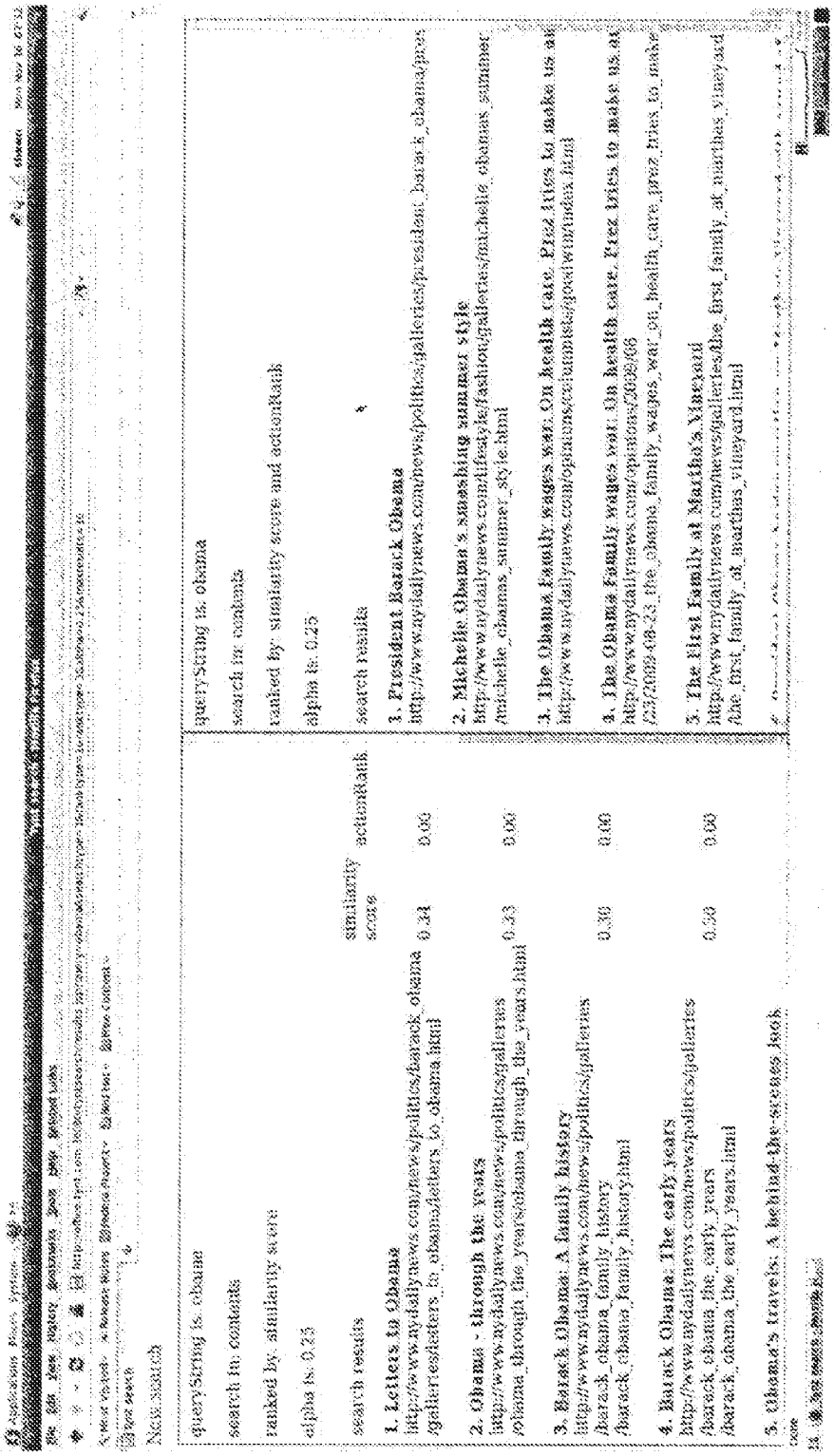
Figure 11B:
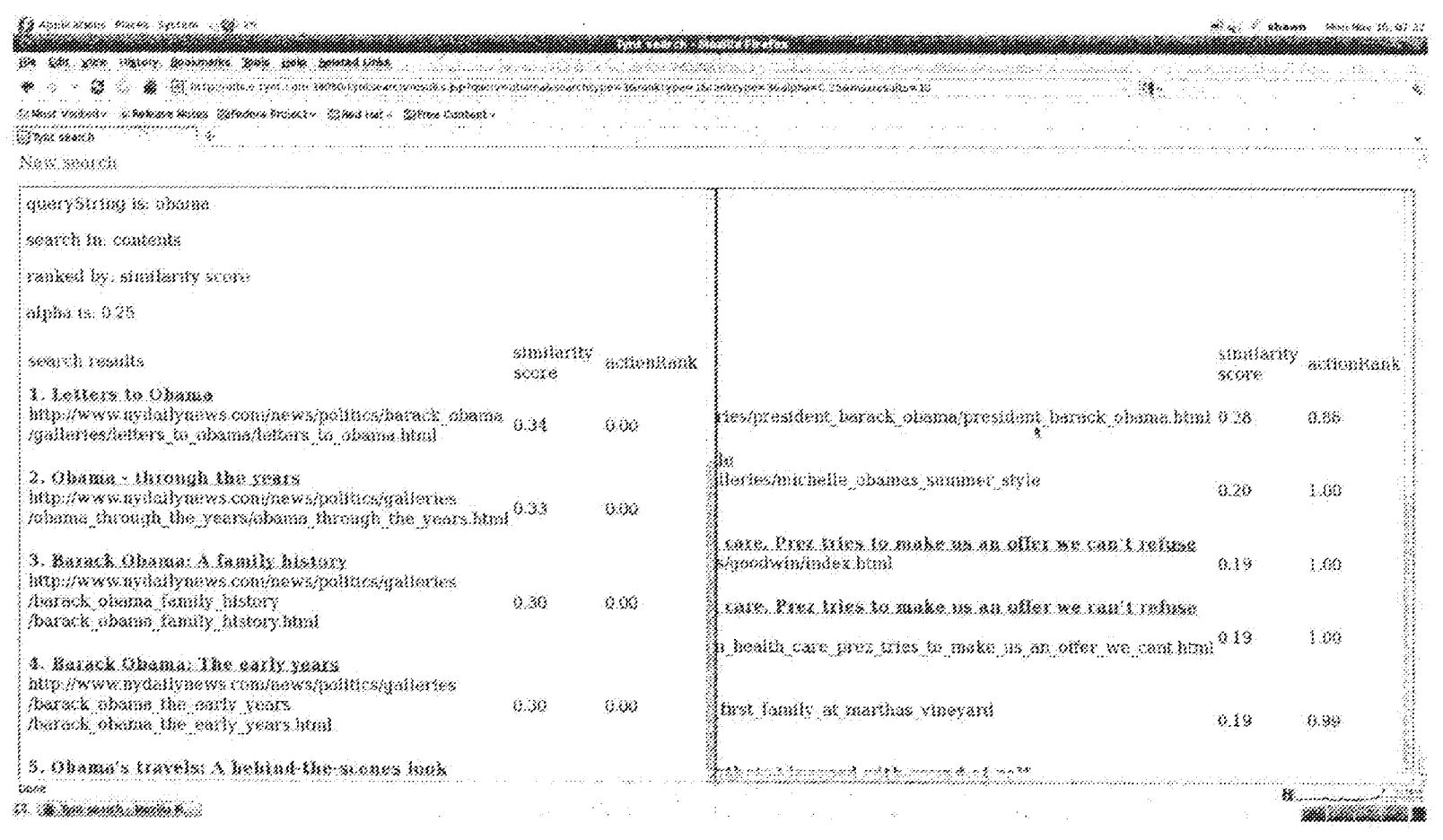
Figure 12B:
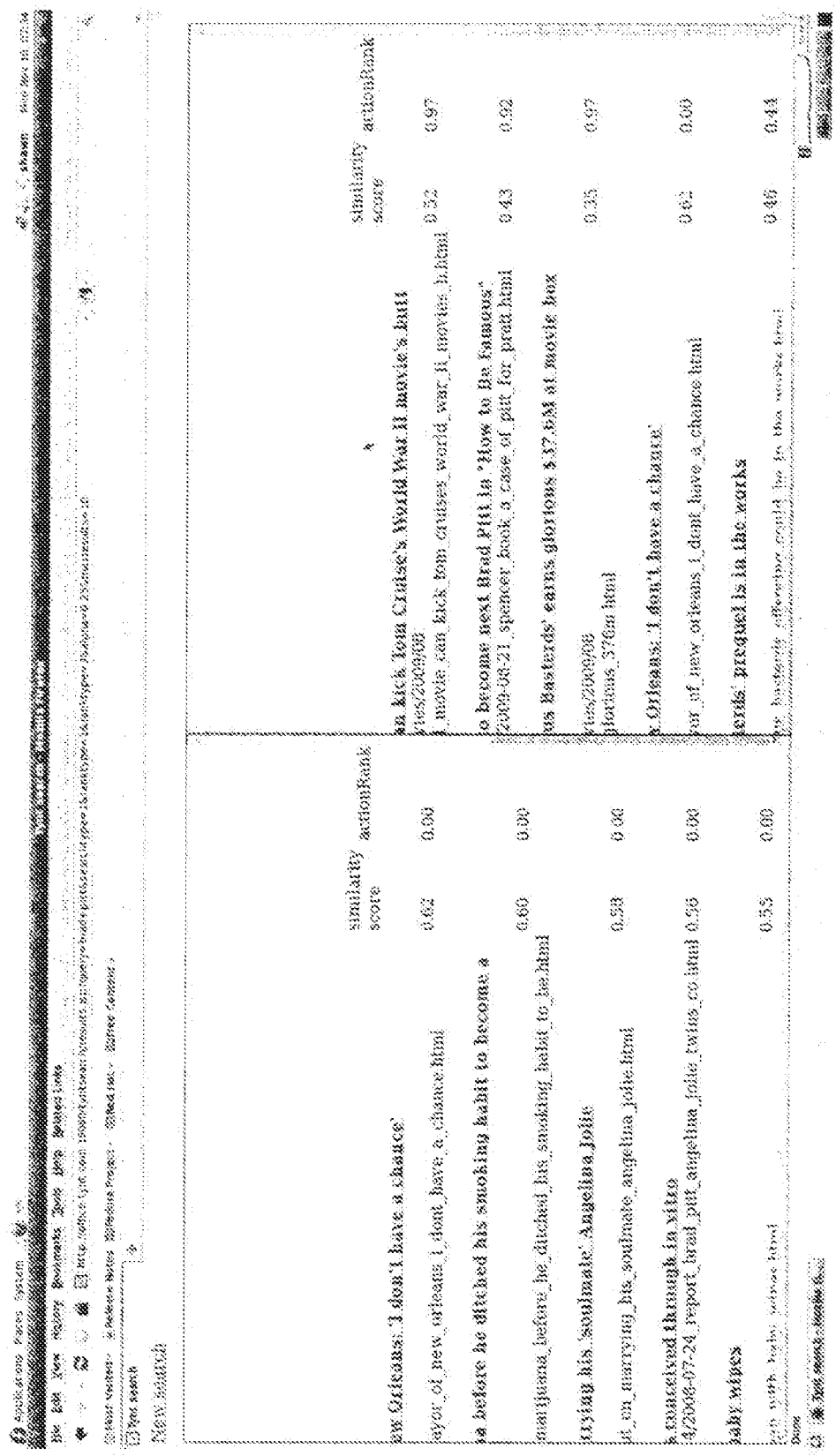

FIGS. 10, 11 A-B and 12A-B show screenshots presented in the example. FIG. 10 is an entry point that receives search parameters, while FIGS. 10A-B and FIGS. 11 A-B display results for specific searches.

FIGS. 10A-B show search results for query "obama" ranked by CSS (left) and Action Rank (right). By searching "obama", the user may seek recent news about the subject. The top pages given by CSS are related to Obama, but most of them are relatively old, because content-based searches only compare the contents of the web pages to the query (e.g. how many times the word "Obama" appear in a web page). This type of search cannot distinguish between new and old pages, and/or popular and forgotten pages. The top pages returned by Action Rank are related to Obama as well but are more recent, highly engaged and relevant, as identified by their Action Ranks FIGS. 11 A-B show search results for query "brad pitt" ranked by CSS (left) and Action Rank (right). The top CSS results for the search query "brad pitt" yields related pages that are no longer popular (low Action Ranks) In other words, these pages are not viewed, selected or copied much. Results returned by Action Rank are more recent. The top results are related to the movie "Inglorious Basterds", released in August 2009 (recall that the web pages are collected on Aug. 25, 2009).

Consequently, the quality of search results are improved by taking user engagement into consideration, especially in those contexts where contents age fast (e.g. news websites). In certain embodiments, calculations can be purely based on user voting, rendering it difficult to manipulate the results. Moreover, the calculations can be easily made because they do not rely on contents or link structures, thereby requiring minimal computation.

Additional Descriptions of Certain Aspects of the Invention

The foregoing descriptions of the invention are intended to be illustrative and not limiting. For example, those skilled with the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for prioritizing search results. In some of these embodiments, prioritization is performed using statistical and other analyses of interactions by one or more users with a network resource and/or network content. Some of these embodiments comprise a network connected server that receives captured information from an agent that is provided in a computing device connected to the network, wherein the captured information relates to an interaction of a user with a network resource. In some of these embodiments, the captured information is related to an interaction of a user with a network resource. Some of these embodiments comprise an aggregator that aggregates the captured information with other captured information related to a plurality of network resources and maintains a repository of aggregated captured information. Some of these embodiments comprise a prioritizer that determines relevance of network content based on characteristics of the aggregated captured information.

In some of these embodiments, each of the captured information and the other captured information characterizes the type of interaction with a network resource. In some of these embodiments, the interactions with the plurality of network resources include at least one of a copy and a mouse-over event. In some of these embodiments, the interactions with the plurality of network resources include at least one of a selection of a displayed link and copying of a portion of content provided by one of the network resources. In some of these embodiments, the agent detects copy, mouse-over and link selection events by intercepting input provided by input devices controlled by the user. In some of these embodiments, the aggregated captured information for each user interaction identifies a type of interaction and the network resource involved in the user interaction. In some of these embodiments, the aggregated captured information for each user interaction identifies a portion of content displayed to the user by the network resource and subject of the user interaction. In some of these embodiments, the type of interaction includes a selection of the identified portion of content. In some of these embodiments, the aggregated captured information for each user interaction includes a copy of the identified portion of content. In some of these embodiments, the identified portion of content includes a link to other content provided by one or more network resources. In some of these embodiments, the type of interaction includes a copying of the identified portion of content and wherein the aggregated captured information for each user interaction includes the copied identified portion of content. In some of these embodiments, the aggregated captured information for each user interaction includes one or more of a copyright notice, an author attribution, and internet address of the user and a time of the each user interaction.

In some of these embodiments, the prioritizer determines relevance for a plurality of search results based on frequency of prior user interactions with the content of the search results. In some of these embodiments, the type of prior user interactions with the content of the search results is identified in the aggregated captured information. In some of these embodiments, the relevance of a search result is determined based on an frequency of occurrence of prior user interactions with links and copies of content that do not include links identified in the aggregated captured information.

Certain embodiments of the invention provide systems and methods of processing search results. In some of these embodiments, the method is implemented in a computer system comprising one or more processors configured to execute one or more computer program modules. Some of these embodiments comprise the method comprises executing, on the one or more processors of the computer system, one or more computer program modules configured to maintain a history of events representative of interactions by a plurality of users with content provided by one or more network resources. Some of these embodiments comprise executing, on the one or more processors of the computer system, one or more computer program modules configured to determine relevance of results of a search using the history of events. In some of these embodiments, the relevance is determined based on frequencies of interactions with individual results of the search. Some of these embodiments comprise executing, on the one or more processors of the computer system, one or more computer program modules configured to reorder the search results based on relevance. In some of these embodiments, the interactions represented in the history of events include interactions with portions of content that do not include links. In some of these embodiments, the interactions represented in the history of events include copying and selection of portions of content. Some of these embodiments comprise providing an agent to one or more user device. In some of these embodiments, the agent includes one or more computer program modules configured to capture event information resulting from a user interaction with the content at the one or more user device.

In some of these embodiments, the events are obtained from one or more computer program modules configured to intercept elements of the content selected by the users for copying. In some of these embodiments, the events are maintained with additional related information that identifies at least one of a user, the selected elements, the content and a device displaying the content to the at least one user. In some of these embodiments, reordering the search results based on relevance includes the step of executing, on the one or more processors of the computer system, one or more computer program modules configured to perform a statistical analysis correlating relevance with frequency of access of network resources. In some of these embodiments, the statistical analysis includes an analysis of copying of portions of the content, identification of most frequently copied elements within a web page, geographic location of one or more user, a tag cloud identifying the most frequently copied elements within a predetermined time period and frequency of generation of links, wherein the links are generated by appending information to copied portions of the content. In some of these embodiments, the agent is provided within a web page.

Certain embodiments of the invention provide systems and methods for identification and communication of user interaction with a network resource. Some of these embodiments comprise hardware and software operating within the software environment of a viewing program operating on a user computer, said viewing program capable of viewing resources available in a network (a "network resource"), which identifies user interactions with a network resource by said user and communicates the interaction to a second computer; wherein said user interaction with said network resource is the copying of, selection of, or printing of certain elements forming part of said network resource or copying of the URL of said network resource. In some embodiments, the communication of the interaction to a second computer comprises communicating to a second computer the time of the user interaction with the network resource, the element or elements interacted with within the network resource, the internet address of the user, or the URL of the network resources interacted with.

Certain embodiments of the invention provide a system for identifying and communicating user interaction with a network resource available to a user. Some of these embodiments comprise a first computer in electronic communication with a network and a second computer in electronic communication with a network. In some of these embodiments, the network resource resides on the first computer, the network resource is received by the second computer and communicated to a user of the second computer by a viewer, typically including a viewing program. In some of these embodiments, the user causes the viewing program to identify a user interaction with elements within or the entirety of the network resource ("content"). The second computer, responsive to the user request to interact with a network resource, may communicate the interaction to the first computer or to a third computer. In some of these embodiments, the communication of the interaction includes a Uniform Resource Locator (URL) of the network resource, the internet address of the second computer, the time of the user interaction with the network resource, or the content.

Certain embodiments of the invention provide a method of copy request interception. Some of these embodiments comprise a software application operating within the software environment of a viewing program operating on a user computer. In some of these embodiments, a viewing program, capable of viewing network resources, intercepts copy requests provided by the user and provides in the alternative a copy of the requested content with additional information. The additional information can be the internet address of the user, the time of the copying event, and/or the content copied. In a further aspect, the additional information provided to the user is one or more of the source of the copied content within the network, a Uniform Resource Locator (URL) for the copied content within the network, a copyright notice and author attribution for the copied content.

Certain embodiments of the invention provide a system for copying elements of a network resource available to a user. Some of these embodiments comprise a first computer in electronic communication with a network. Some of these embodiments comprise a second computer in electronic communication with a network. In some of these embodiments, the network resource resides on the first computer. In some of these embodiments, the network resource is received by the second computer and communicated to a user of the second computer by a viewing program. In some of these embodiments, the user causes the viewing program to copy some or all elements of the network resource (the "content"). In some of these embodiments, the second computer, in response to the user request to copy, copies the content to a transient or permanent memory within the second computer, creating copied content, and appends additional information within the copied content. In some of these embodiments, the additional information includes the source of the copied content within the network, a Uniform Resource Locator (URL) for the copied content within the network, a copyright notice or author attribution for the copied content.

Certain embodiments of the invention provide a method of copy request interception. Some of these embodiments comprise an agent operating within a viewing component operating on a user computer. In some of these embodiments, the viewing component is capable of viewing network resources. In some of these embodiments, the agent intercepts copy requests provided by the user. In some of these embodiments, the agent provides a copy of the requested content with additional information provided. In some of these embodiments, the copy is provided to the user and/or a third party. In some of these embodiments, the third party is an administrator of the content and the additional information provided includes the internet address of the user, the time of the copying event and/or the content copied. In some of these embodiments, the additional information provided to the user is includes the source of the copied content within the network, a Uniform Resource Locator (URL) for the copied content within the network, a copyright notice and/or an author attribution for the copied content.

Certain embodiments of the invention provide a system for copying elements of a network resource available to a user. Some of these embodiments comprise first and second computers in electronic communication with a network. In some of these embodiments, the network resource resides on the first computer and is received by the second computer. In some of these embodiments, the second computer displays the network resource to a user of the second computer. In some of these embodiments, the user provides input that causes the second computer to copy some or all elements of the network resource. In some of these embodiments, the second computer responds to a user request to copy by copying content to a transient or permanent memory within the second computer, thereby creating copied content. In some of these embodiments, the second computer appends additional information to the copied content. In some of these embodiments, the additional information includes a source of the copied content within the network, a Uniform Resource Locator (URL) for the copied content within the network, a copyright notice and/or author attribution for the copied content.

Certain embodiments of the invention provide a method of copy request interception. Some of these embodiments comprise software (an agent) operating within a software environment of a viewing program operating on a user computer. In some of these embodiments, the viewing program is configured to view network resources. In some of these embodiments, the agent intercepts copy requests provided by the user. In some of these embodiments, the agent provides a copy of the requested content with additional information provided to user and/or a third party. In some of these embodiments, the agent further communicates information to a second computer where the information includes the Internet address of the user, the time of the copying event and/or the content copied. In some of these embodiments, the third party is an administrator of the content and the additional information includes the Internet address of the user, the time of the copying event and/or the content copied. In some of these embodiments, the additional information provided to the user includes the source of the copied content within the network, a Uniform Resource Locator (URL) for the copied content within the network, a copyright notice and/or author attribution for the copied content.

Certain embodiments of the invention provide a system for copying elements of a network resource available to a user. Some of these embodiments comprise first and second computers second computer in electronic communication with a network. In some of these embodiments, the network resource resides on the first computer and is provided to the second computer for communication to a user of the second computer by a viewing program. In some of these embodiments, the user causes the viewing program to copy elements of the network resource as content. In some of these embodiments, the second computer, in response to the user request to copy, copies the content to a transient or permanent memory within the second computer, creating copied content, and appends user additional information within the copied content. In some of these embodiments, the second computer, in response to the user request to copy said content, provides the first computer with additional information. In some of these embodiments, the additional information includes the source of the copied content within the network, a Uniform Resource Locator (URL) for the copied content within the network, a copyright notice and/or author attribution for the copied content. In some of these embodiments, the additional information includes the Internet address of the user, the time of the copying event and/or the copied content.

Certain embodiments of the invention provide a method of modifying search results arising from the searching of a collection of network resources. Some of these embodiments comprise increasing the identified relevance of certain network resources within the search results based on user interaction with particular network resources as compared to the collection of network resources. In some of these embodiments, the user interaction with the particular network resource includes the copying of, selection of and/or printing of certain elements forming part of the network resource. In some of these embodiments, the user interaction includes copying of the URL of the network resource.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense and the invention is to be considered limited solely by the scope of the appended claims.

What is claimed is:

1. A system including one or more computing devices connected to a network and configured for prioritizing network content using information captured from interactions of one or more users with a network resource, the system comprising:
 a network-connected server that receives captured information from an agent that is provided in at least one computing device of the one or more computing devices connected to the network, wherein the captured information relates to an interaction of a user with the network resource;

an aggregator of the one or more computing devices and associated with the network-connected server that aggregates the captured information with other information related to interactions with a plurality of network resources and that maintains a repository of aggregated captured information;

a prioritizer of the one or more computing devices and associated with the network-connected server that determines relevance of network content based on characteristics of the aggregated captured information; and wherein the interactions with the plurality of network resources include at least one of a copy and a mouse-over event and the network-connected server are configured to reorder the aggregated captured information, based at least in part, using a statistical analysis correlating the relevance of the network content determined by the prioritizer with a determination of a frequency of access to the network content provided by the plurality of network resources, and wherein the statistical analysis includes at least one of 1) an analysis of the copy event, 2) an identification of a most frequently copied element of the network content provided by the plurality of network resources, 3) a geographic location of the user, 4) a tag cloud identifying the most frequently copied element within a predetermined time period and 5) a frequency of generation of a link associated with the network content.

2. A method of processing search results, wherein the method is implemented in a computer system comprising one or more processors configured to execute one or more computer program modules, the method comprising:

executing, on the one or more processors of the computer system, one or more computer program modules configured to maintain a history of events representative of interactions by a plurality of users with content provided by one or more network resources;

executing, on the one or more processors of the computer system, one or more computer program modules configured to determine relevance of results of a search using the history of event information, wherein the relevance is determined based on frequencies of interactions with individual results of the search; and executing, on the one or more processors of the computer system, one or more computer program modules configured to reorder the search results based on relevance, wherein the interactions represented in the history of event information include copying and selection of portions of content and wherein the search results are reordered based on relevance by executing, on the one or more processors of the computer system, one or more computer program modules configured to perform a statistical analysis correlating relevance of the portions of the content with frequency of access to the portions of the content provided by the network resources, and wherein the statistical analysis includes at least one of 1) an analysis of the copy event, 2) an identification of a most frequently copied element of the network content provided by the plurality of network resources, 3) a geographic location of the user, 4) a tag cloud identifying the most frequently copied element within a predetermined time period and 5) a frequency of generation of a link associated with the content provided by the network.

3. The system of claim 1, wherein the interactions with the plurality of network resources include interactions of the one or more users.

4. The system of claim 1, wherein the interactions with the plurality of network resources include the copy and the mouse-over event, and wherein the agent is configured to detect the copy and the mouse-over event by intercepting input from input devices controlled by the computing device.

5. The system of claim 1, wherein the interactions with the plurality of network resources include the copy event that includes copying of a portion of content provided by one of the network resources, wherein the portion of content provides no link to other content.

6. The system of claim 1, wherein the aggregated captured information for each user interaction identifies a type of the each user interaction and the network resource involved in the each user interaction.

7. The system of claim 6, wherein the aggregated captured information for the each user interaction identifies a portion of content that is the subject of the each user interaction.

8. The system of claim 7, wherein the type of interaction includes a selection of the identified portion of content and wherein the aggregated captured information for the each user interaction includes a copy of the identified portion of content.

9. The system of claim 8, wherein the identified portion of content includes a link to other content provided by the plurality of network resources.

10. The system of claim 7, wherein the aggregated captured information for the each user interaction includes one or more of a copyright notice, an author attribution, and an internet address of the user and a time of the each user interaction.

11. The system of claim 1, wherein the prioritizer is configured to determine relevance for a plurality of search results based on frequency of prior user interactions with the content of the search results.

12. The system of claim 11, wherein the relevance of a search result is determined based on a frequency of occurrence of prior interactions by the one or more users with a link and prior interactions of the one or more users, involving copying of content that does not include the link.

13. The system of claim 1, wherein the link is generated by appending information to copied portions of the network content.

14. A method of processing search results according to claim 2, further comprising:

providing an agent to one or more user devices for use by the plurality of users, wherein the agent includes one or more computer program modules configured to capture event information resulting from a user interaction with the content at the one or more user device.

15. A method of processing search results according to claim 14, wherein the user interactions include one or more of a content copy interaction, a mouse-over interaction and a link selection interaction.

16. A method of processing search results according to claim 15, wherein event information includes information that identifies at least one of a user, a selected element, copied content and the one or more user devices.

17. A method of processing search results according to claim 14, wherein the agent is provided within a web page.

18. The system of claim 2, wherein the link is generated by appending information to copied portions of the network content.

* * * * *